US012273927B2

(12) United States Patent
Da Silva et al.

(10) Patent No.: US 12,273,927 B2
(45) Date of Patent: Apr. 8, 2025

(54) MULTI-BEAM RANDOM ACCESS PROCEDURE IN HANDOVER EXECUTION

(71) Applicant: TELEFONAKTIEBOLAGET LM ERICSSON (PUBL), Stockholm (SE)

(72) Inventors: Icaro L. J. Da Silva, Solna (SE); Henrik Sahlin, Molnlycke (SE); Mats Folke, Vallingby (SE); Janne Peisa, Espoo (FI); Jan Christoffersson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/244,269

(22) Filed: Sep. 10, 2023

(65) Prior Publication Data
US 2023/0422312 A1 Dec. 28, 2023

Related U.S. Application Data

(63) Continuation of application No. 16/651,083, filed as application No. PCT/IB2018/057577 on Sep. 28, 2018, now Pat. No. 11,758,585.
(Continued)

(51) Int. Cl.
*H04W 74/08* (2024.01)
*H04W 36/00* (2009.01)
(Continued)

(52) U.S. Cl.
CPC ... *H04W 74/0833* (2013.01); *H04W 36/0064* (2023.05); *H04W 72/02* (2013.01); *H04W 72/046* (2013.01); *H04W 72/54* (2023.01)

(58) Field of Classification Search
None
See application file for complete search history.

(56) References Cited

U.S. PATENT DOCUMENTS

2017/0207843 A1   7/2017   Jung
2017/0231011 A1   8/2017   Park
(Continued)

FOREIGN PATENT DOCUMENTS

EP   2076087 B1   3/2016
RU   2603969 C2   12/2016

OTHER PUBLICATIONS

Huawei, HiSilicon, "Beam Selection During Handover", Aug. 21-25, 2017, 3GPP TSG-RAN WG2 #99, R2-1708875, pp. 1-4 (Year: 2017).*
(Continued)

*Primary Examiner* — Steve R Young

(57) ABSTRACT

A method in a UE comprises: receiving a message from a network node comprising information about one or more sets of dedicated random access channel (RACH) resources, each set of dedicated RACH resources associated with a beam associated with a target cell; obtaining an estimate of beam quality for each beam associated with the sets of dedicated RACH resources; determining, based on the obtained estimate of beam quality, whether any beam associated with the one or more sets of dedicated RACH resources meets one or more criteria of a first set of criteria for performing random access; and performing random access based on whether any beam associated with the one or more sets of dedicated RACH resources meets the one or more criteria of the first set of criteria for performing random access.

11 Claims, 16 Drawing Sheets

Related U.S. Application Data

(60) Provisional application No. 62/564,496, filed on Sep. 28, 2017.

(51) Int. Cl.
*H04W 72/02* (2009.01)
*H04W 72/044* (2023.01)
*H04W 72/54* (2023.01)
*H04W 74/0833* (2024.01)

(56) References Cited

U.S. PATENT DOCUMENTS

| | | | |
|---|---|---|---|
| 2019/0045567 A1* | 2/2019 | Wu | H04W 36/0069 |
| 2019/0053313 A1 | 2/2019 | Zhou | |
| 2019/0253127 A1 | 8/2019 | Kang | |
| 2020/0059285 A1 | 2/2020 | Zhang et al. | |
| 2020/0059398 A1 | 2/2020 | Pan | |
| 2020/0145082 A1* | 5/2020 | Chen | H04L 5/0023 |
| 2020/0275319 A1* | 8/2020 | Murray | H04B 7/0617 |
| 2021/0112539 A1* | 4/2021 | Wu | H04W 72/046 |

OTHER PUBLICATIONS

Huawei (Year: 2017).*
AT&T, Remaining Details of RACH Procedure and RACH Configuration, R1-1716162, 3GPP TSG RAN WG1 Meeting NR#3, Nagoya, Japan, Sep. 18-21, 2017.
Ericsson, "Remaining details on RACH procedure." 3GPP TSG RAN WG1 Ad-Hoc#3 R1-1716155, Sep. 12, 2017, pp. 18.
Huawei et al., "Beam selection during handover." 3GPP TSG-RAN WG2 #99, R2-1708875, Berlin, Germany, Aug. 21-25, 2017.
LG Electronics Inc. "Basic handover procedure considering beam." 3GPP TSG RAN WG2 #99 R2-1709129, Aug. 11, 2017, pp. 2.
Mediatek Inc., "RACH during Handover." 3GPP TSG RAN WG2 #99 R2-1708048, Berlin, Germany, Aug. 21-25, 2017.
Qualcomm Incorporated, Beam aware RACH procedure and beam refinement during handover, R2-1709091, 3GPP TSG-RAN WG2 Meeting #99, Berlin, Germany, Aug. 21-28, 2017.

* cited by examiner

MULTI-BEAM RANDOM ACCESS PROCEDURE IN HANDOVER EXECUTION

PRIORITY CLAIMS

This application is a Continuation of U.S. application Ser. No. 16/651,083 filed on Mar. 26, 2020, which is a 371 of International Application No. PCT/IB2018/057577, filed Sep. 28, 2018, which claims the benefit of U.S. Application No. 62/564,496, filed Sep. 28, 2017, the disclosures of which are fully incorporated herein by reference.

TECHNICAL FIELD

The present disclosure relates, in general, to wireless communications and, more particularly, to a multi-beam random access procedure.

BACKGROUND

In Long Term Evolution (LTE), an RRC_CONNECTED user equipment (UE) performs handovers when the UE needs to change cells. This is summarized in the 3 rd Generation Partnership Project (3GPP) Technical Specification (TS) 36.300.

FIGS. 1A and 1B illustrate handover as described in 3GPP TS 36.300. At step 1-0, the UE context within source evolved Node B (eNB) 10 contains information regarding roaming and access restrictions, which were provided either at connection establishment or at the last Tracking Area (TA) update. At step 1-1, source eNB 10 configures measurement procedures for UE 5 according to the roaming and access restriction information and, for example, the available multiple frequency band information. Measurements provided by source eNB 10 may assist the function controlling the connection mobility of UE 5.

At step 1-2, a MEASUREMENT REPORT is triggered and sent to source eNB 10 by UE 5. At step 1-3, source eNB 10 decides, based on the MEASUREMENT REPORT and radio resource management (RRM) information, to hand off UE 5. At step 1-4, source eNB 10 issues a HANDOVER REQUEST message to target eNB 15, passing necessary information to prepare the handover at the target side. This information may include, for example: the UE X2 signalling context reference at source eNB 10; the UE S1 Evolved Packet Core (EPC) signalling context reference; the target cell ID; $K_{eNB^*}$ (a key generated by the source eNB to be used as KeNB at the target eNB to generate other keys); the radio resource control (RRC) context (including the Cell-Radio Network Temporary Identifier (C-RNTI) of UE 5 in source eNB 10); the access stratum (AS)-configuration; the Evolved Packet System (EPS) Radio Access Bearer (E-RAB) context and physical layer ID of the source cell plus short Message Authentication Code-Integrity (MAC-I) for possible radio link failure (RLF) recovery. The UE X2/UE S1 signalling references enable target eNB 15 to address source eNB 10 and the EPC. The E-RAB context includes necessary Radio Network Layer (RNL) and Transport Network Layer (TNL) addressing information, and Quality of Service (QoS) profiles of the E-RABs.

At step 1-5, admission control may be performed by target eNB 15 dependent on the received E-RAB QoS information to increase the likelihood of a successful handover, if the resources can be granted by target eNB 15. Target eNB 15 configures the required resources according to the received E-RAB QoS information and reserves a C-RNTI and optionally a Random Access Channel (RACH) preamble. The AS-configuration to be used in the target cell can either be specified independently (i.e., an "establishment") or as a delta compared to the AS-configuration used in the source cell (i.e., a "reconfiguration").

At step 1-6, target eNB 15 prepares handover with L1/L2 and sends the HANDOVER REQUEST ACKNOWLEDGE message to source eNB 10. The HANDOVER REQUEST ACKNOWLEDGE message includes a transparent container to be sent to UE 5 as an RRC message to perform the handover. The container includes a new C-RNTI, target eNB security algorithm identifiers for the selected security algorithms, and may include a dedicated RACH preamble and possibly some other parameters (e.g., access parameters, System Information Blocks (SIBs), etc.). The HANDOVER REQUEST ACKNOWLEDGE message may also include RNL/TNL information for the forwarding tunnels, if necessary.

Note that as soon as source eNB 10 receives the HANDOVER REQUEST ACKNOWLEDGE, or as soon as the transmission of the handover command is initiated in the downlink (DL), data forwarding may be initiated.

As described in more detail below, remaining steps 1-7 through 1-16 provide means to avoid data loss during handover and are further detailed in sections 10.1.2.1.2 and 10.1.2.3 of 3GPP TS 36.300.

At step 1-7, target eNB 15 generates the RRC message to perform the handover (i.e., RRCConnectionReconfiguration message including the mobilityControlInformation) to be sent by source eNB 10 towards UE 5. Source eNB 10 performs the necessary integrity protection and ciphering of the message. UE 5 receives the RRCConnectionReconfiguration message with necessary parameters (e.g., new C-RNTI, target eNB security algorithm identifiers, and optionally dedicated RACH preamble, target eNB SIBs, etc.) and is commanded by source eNB 10 to perform the handover. UE 5 does not need to delay the handover execution for delivering the Hybrid Automatic Repeat Request (HARQ)/Automatic Repeat Request (ARQ) responses to source eNB 10.

At step 1-8, source eNB 10 sends the SN STATUS TRANSFER message to target eNB 15 to convey the uplink (UL) Packet Data Convergence Protocol (PDCP) Sequence Number (SN) receiver status and the DL PDCP SN transmitter status of E-RABs for which PDCP status preservation applies (e.g., for Radio Link Control (RLC) Acknowledged Mode (AM)). The UL PDCP SN receiver status includes at least the PDCP SN of the first missing UL Service Data Unit (SDU) and may include a bit map of the receive status of the out of sequence UL SDUs that UE 5 needs to retransmit in the target cell, if there are any such SDUs. The DL PDCP SN transmitter status indicates the next PDCP SN that target eNB 15 shall assign to new SDUs, not having a PDCP SN yet. Source eNB 10 may omit sending this message if none of the E-RABs of UE 5 shall be treated with PDCP status preservation.

After receiving the RRCConnectionReconfiguration message including the mobilityControlInformation, at step 1-9 UE 5 performs synchronisation to target eNB 15 and accesses the target cell via the RACH, following a contention-free procedure if a dedicated RACH preamble was indicated in the mobilityControlInformation, or following a contention-based procedure if no dedicated preamble was indicated. UE 5 derives target eNB specific keys and configures the selected security algorithms to be used in the target cell.

At step 1-10, target eNB 15 responds with an UL allocation and timing advance.

When UE 5 has successfully accessed the target cell, at step 1-11 UE 5 sends the RRCConnectionReconfigurationComplete message (C-RNTI) to confirm the handover, along with an UL Buffer Status Report (BSR), whenever possible, to target eNB 15 to indicate that the handover procedure is completed for UE 5. Target eNB 15 verifies the C-RNTI sent in the RRCConnectionReconfigurationComplete message.

Referring now to FIG. 1B, target eNB 15 can now begin sending data to UE 5. At step 1-12, target eNB 15 sends a PATH SWITCH REQUEST message to Mobility Management Entity (MME) 20 to inform MME 20 that UE 5 has changed cell. At step 1-13, MME 20 sends a MODIFY BEARER REQUEST message to serving gateway 25. At step 1-14, serving gateway 25 switches the DL data path to the target side. Serving gateway 25 sends one or more "end marker" packets on the old path to source eNB 10 and then can release any User-plane/TNL resources towards source eNB 10.

At step 1-15, serving gateway 25 sends a MODIFY BEARER RESPONSE message to MME 20. At step 1-16, MME 20 confirms the PATH SWITCH REQUEST message with the PATH SWITCH REQUEST ACKNOWLEDGE message. By sending the UE CONTEXT RELEASE message at step 1-17, target eNB 15 informs source eNB 10 of the success of handover and triggers the release of resources by source eNB 10. Target eNB 15 sends this message after the PATH SWITCH REQUEST ACKNOWLEDGE message is received from the MME 20.

Upon reception of the UE CONTEXT RELEASE message, at step 1-18 source eNB 10 can release radio and Control-plane related resources associated to the UE context. Any ongoing data forwarding may continue.

When an X2 handover is used involving Home eNBs (HeNBs) and when the source HeNB is connected to a HeNB gateway (GW), a UE CONTEXT RELEASE REQUEST message including an explicit GW Context Release Indication is sent by the source HeNB, in order to indicate that the HeNB GW may release of all the resources related to the UE context. Concerning the handover execution and in particular the random access procedure, the 3GPP TS 38.331 specifications define the following:

5.3.5.4 Reception of an RRCConnectionReconfiguration including the mobilityControlInfo by the UE (handover)

If the RRCConnectionReconfiguration message includes the mobilityControlInfo and the UE is able to comply with the configuration included in this message, the UE shall:

1> stop timer T310, if running;
1> stop timer T312, if running;
1> start timer T304 with the timer value set to t304, as included in the mobilityControlInfo;
1> stop timer T370, if running;
1> if the carrierFreq is included:
2> consider the target PCell to be one on the frequency indicated by the carrierFreq with a physical cell identity indicated by the targetPhysCellId;
1> else:
2> consider the target PCell to be one on the frequency of the source PCell with a physical cell identity indicated by the targetPhysCellId;
1> start synchronising to the DL of the target PCell;
. . .
1> if MAC successfully completes the random access procedure; or
1> if MAC indicates the successful reception of a PDCCH transmission addressed to C-RNTI:
2> stop timer T304;

The LTE random access procedure comes in two forms, allowing access to be either contention-based (implying an inherent risk of collision) or contention-free. In contention-based random access, a preamble sequence is randomly chosen by the UE, which may result in more than one UE simultaneously transmitting the same signature, leading to a need for a subsequent contention resolution process. For handovers, the eNB has the option of preventing contention occurring by allocating a dedicated signature to a UE (contention-free).

The contention-based procedure consists of four-step: (1) preamble transmission; (2) random access response; (2) transmission of message 3 (MSG.3); and (4) contention resolution message.

FIG. 2 illustrates an example of a contention-based random access procedure. At step 201, UE 5 sends a random access preamble (with embedded 1-bit indication for L2/L3 message size) to eNB 15. In connection with preamble transmission, UE 5 selects one of the 64-Z Physical Random Access Channel (PRACH) contention-based sequences (where Z is the Number allocation for contention-free preambles allocated by eNodeB 15). The set of contention-based signatures is further subdivided into two subgroups, so that the choice of preamble can carry one bit of information relating to the amount of transmission resources needed to transmit MSG.3. The broadcast system information (SI) indicates which signatures are in each of the two subgroups (each subgroup corresponding to one value of the one bit of information), as well as the meaning of each subgroup. UE 5 selects a sequence from the subgroup corresponding to the size of transmission resource needed for the appropriate RACH use case (some use cases require only a few bits to be transmitted in MSG.3, so choosing the small message size avoids allocating unnecessary UL resources). In selecting the appropriate resource size to indicate, UE 5 takes into account the current DL path-loss and the required transmission power for MSG.3, in order to avoid being granted resources for MSG.3 that would need a transmission power exceeding that which UE 5's maximum power would allow. The transmission power required for MSG.3 is calculated based on some parameters broadcast by eNB 15, so that the network has some flexibility to adapt the maximum size of MSG.3. The eNB 15 can control the number of sequences in each subgroup according to the observed loads in each group.

The initial preamble transmission power setting is based on an open-loop estimation with full compensation for the path-loss. This is designed to ensure that the received power of the sequence is independent of the path-loss. UE 5 estimates the path-loss by averaging measurements of the DL Reference Signal Received Power (RSRP). The eNB 15 may also configure an additional power offset, depending, for example, on the desired received Signal-to-Interference-plus-Noise Ratio (SINR), the measured UL interference and noise level in the time-frequency slots allocated to RACH preambles, and possibly also on the preamble format.

At step 202, eNB 15 sends a random access response (RAR) to UE 5. The RAR conveys the identity of the detected preamble (Random Access Preamble ID (RAPID)), a timing alignment instruction to synchronize subsequent UL transmissions from UE 5, an initial UL resource grant for transmission of MSG.3, and an assignment of a temporary C-RNTI (which may or may not be made permanent as a result of the next step—contention resolution). The RAR is also scrambled with the Random Access Radio Network Temporary Identifier (RA-RNTI) when the RAR was detected and indicates the PRACH resource when the preamble was transmitted. The RAR message can also include a "backoff indicator" which eNB 15 can set to instruct UE 5 to back off for a period of time before retrying a random access attempt. UE 5 expects to receive the RAR within a time window, of which the start and end are configured by eNB 15, and broadcast as part of the cell-specific system information. If UE 5 does not receive a RAR within the configured time window, it selects another sequence to be transmitted again. The minimum delay for the transmission of another preamble after the end of the RAR window is 3 ms.

The eNB 15 may configure preamble power ramping so that the transmission power for each transmitted preamble is increased by a fixed step. The eNB 15 can configure the steps in power ramping in terms of power and the maximum number of attempts in total before declaring random access failure.

At step 203, UE 5 transmits MSG.3 to eNB 15. This message is the first scheduled UL transmission on the Physical Uplink Shared Channel (PUSCH) and makes use of HARQ. It is addressed to the temporary C-RNTI allocated in the RAR and carries (in the case of handovers) the provided C-RNTI. In case of a preamble collision having occurred at Step 201, the colliding UEs will receive the same temporary C-RNTI through the RAR and will also collide in the same UL time-frequency resources when transmitting their L2/L3 message. This may result in interference such that no colliding UE can be decoded, and the UEs restart the random access procedure after reaching the maximum number of HARQ retransmissions. However, if one UE is successfully decoded, the contention remains unresolved for the other UEs. The following DL message (in Step 204) allows a quick resolution of this contention.

At step 204, eNB 15 sends a message for early contention resolution. The contention resolution message uses HARQ. It is addressed to the C-RNTI (if indicated in the MSG.3 message at step 203) or to the temporary C-RNTI, and, in the latter case, echoes the UE identity contained in MSG.3. In case of a collision followed by successful decoding of the MSG.3, the HARQ feedback is transmitted only by the UE which detects its own UE identity (or C-RNTI); other UEs understand there was a collision, transmit no HARQ feedback, and can quickly exit the current random access procedure and start another one.

There currently exist certain challenge(s). For example, in New Radio (NR), there are some aspects that differ from LTE that impact UE behavior during random access. One change is that in each NR cell there can be multiple Synchronization Signal Blocks (SSBs) sets comprised of one or multiple SSBs that can be transmitted in different beams (or directions). For each of these directions there can be some differences in the PRACH resource configuration. Hence, in NR, before initiating random access the UE shall perform beam selection (or SSB selection) within a cell to derive the PRACH resources that should be used such as time/frequency resources and sequence(s).

SUMMARY

To address the foregoing problems with existing solutions, disclosed is a method in a UE. The method comprises receiving a message from a network node, the message comprising information about one or more sets of dedicated RACH resources, each set of dedicated RACH resources associated with a beam associated with a target cell. The method comprises obtaining an estimate of beam quality for each beam associated with the one or more sets of dedicated RACH resources. The method comprises determining, based on the obtained estimate of beam quality for each beam associated with the one or more sets of dedicated RACH resources, whether any beam associated with the one or more sets of dedicated RACH resources meets one or more criteria of a first set of criteria for performing random access. The method comprises performing random access based on whether any beam associated with the one or more sets of dedicated RACH resources meets the one or more criteria of the first set of criteria for performing random access.

In certain embodiments, determining whether any beam associated with the one or more sets of dedicated RACH resources meets the one or more criteria of the first set of criteria for performing random access may comprise determining that at least one beam meets the one or more criteria of the first set of criteria for performing random access.

In certain embodiments, performing random access may comprise transmitting a random access preamble using the dedicated RACH resources associated with the at least one beam determined to meet the one or more criteria of the first set of criteria for performing random access.

In certain embodiments, the at least one beam may comprise a plurality of beams and performing random access may comprise selecting one of the plurality of beams based on one or more criteria of a second set of criteria and transmitting a random access preamble using the dedicated resources associated with the selected beam. In certain embodiments, the one or more criteria of the second set of criteria may comprise one or more of: a beam with a strongest measurement quantity; a beam whose time domain RACH resources occur first; and a beam having radio conditions that has had the least amount of change over a period of time.

In certain embodiments, the method may further comprise receiving information about common RACH resources for the target cell. In certain embodiments, the method may further comprise prioritizing dedicated RACH resources over the common RACH resources for performing random access. In certain embodiments, determining whether any beam associated with the one or more sets of dedicated RACH resources meets the one or more criteria of the first set of criteria for performing random access may comprise determining that no beam meets the one or more criteria of the first set of criteria for performing random access, and performing random access may comprise transmitting a random access preamble using the common RACH resources.

In certain embodiments, the one or more criteria of the first set of criteria may comprise one or more of: a reference signal received power (RSRP) threshold; a reference signal received quality (RSRQ) threshold; and a signal-to-interference-plus-noise (SINR) threshold.

In certain embodiments, the beam associated with the target cell may comprise a Synchronization Signal/Physical Broadcast Channel block (SSB).

In certain embodiments, the beam associated with the target cell may comprise a Channel State Information Reference Signal (CSI-RS) resource.

In certain embodiments, obtaining the estimate of beam quality for each beam associated with the one or more sets of dedicated RACH resources may comprise performing one or more measurements on each beam associated with the one or more sets of dedicated RACH resources, the one or more measurements indicative of beam quality. In certain embodiments, the one or more measurements may comprise one or more of: an RSRP measurement; an RSRQ measurement; and a SINR measurement.

In certain embodiments, obtaining the estimate of beam quality for each beam associated with the one or more sets of dedicated RACH resources may comprise obtaining results of one or more previously performed measurements on each beam associated with the one or more sets of dedicated RACH resources, the one or more previously performed measurements indicative of beam quality. In certain embodiments, the one or more previously performed measurements may comprise one or more of: an RSRP measurement; an RSRQ measurement; and a SINR measurement.

In certain embodiments, performing random access may comprise initiating a random access procedure, and the method may further comprise starting a timer in response to initiating the random access procedure.

In certain embodiments, the received message may be a handover configuration message, and the random access procedure may be initiated in response to receiving the handover configuration message. In certain embodiments, the timer may comprise a handover failure timer.

In certain embodiment, the method may comprise detecting a beam failure. The random access procedure may be initiated in response to detecting the beam failure, and the message comprising information about the one or more sets of dedicated RACH resources may be received after the beam failure is detected. In certain embodiments, the timer may comprise a beam failure recovery timer.

In certain embodiments, the method may further comprise receiving a random access response message before the timer expires. In certain embodiments, the received random access response message may comprise an instruction to the UE to back off.

In certain embodiments, the method may further comprise determining that no random access response message was received before the timer expired. In certain embodiments, the method may further comprise selecting a different beam for performing random access. In certain embodiments, the method may further comprise increasing a transmission power of the UE and reevaluating whether any beam associated with the one or more sets of dedicated RACH resources meets one or more criteria of a first set of criteria for performing random access.

Also disclosed is a UE. The UE comprises a receiver, a transmitter, and processing circuitry coupled to the receiver and the transmitter. The processing circuitry is configured to receive a message from a network node, the message comprising information about one or more sets of dedicated RACH resources, each set of dedicated RACH resources associated with a beam associated with a target cell. The processing circuitry is configured to obtain an estimate of beam quality for each beam associated with the one or more sets of dedicated RACH resources. The processing circuitry is configured to determine, based on the obtained estimate of beam quality for each beam associated with the one or more sets of dedicated RACH resources, whether any beam associated with the one or more sets of dedicated RACH resources meets one or more criteria of a first set of criteria for performing random access. The processing circuitry is configured to perform random access based on whether any beam associated with the one or more sets of dedicated RACH resources meets the one or more criteria of the first set of criteria for performing random access.

Also disclosed is a computer program, the computer program comprising instructions configured to perform the above-described method in a UE.

Also disclosed is a computer program product, the computer program product comprising a non-transitory computer-readable storage medium, the non-transitory computer readable storage medium comprising a computer program comprising computer-executable instructions which, when executed on a processor, are configured to perform the above-described method in a UE.

Also disclosed is a method in a network node. The method comprises transmitting a message to a UE, the message comprising information about one or more sets of dedicated RACH resources, each set of dedicated RACH resources associated with a beam associated with the network node. The method comprises performing random access with the UE based on whether any beam associated with the one or more sets of dedicated RACH resources meets one or more criteria of a first set of criteria for performing random access.

In certain embodiments, at least one beam may meet the one or more criteria of the first set of criteria for performing random access.

In certain embodiments, performing random access may comprise receiving a random access preamble from the UE on the dedicated RACH resources associated with the at least one beam that meets the one or more criteria of the first set of criteria for performing random access.

In certain embodiments, the at least one beam may comprise a plurality of beams and performing random access may comprise receiving a random access preamble from the UE on dedicated RACH resources associated with one of the plurality of beams selected by the UE based on one or more criteria of a second set of criteria. In certain embodiments, the one or more criteria of the second set of criteria may comprise one or more of: a beam with a strongest measurement quantity; a beam whose time domain RACH resources occur first; and a beam having radio conditions that has had the least amount of change over a period of time.

In certain embodiments, no beam associated with the one or more sets of dedicated RACH resources may meet the one or more criteria of the first set of criteria for performing random access, and the method may comprise: transmitting information about common RACH resources for the network node; and receiving a random access preamble from the UE on the common RACH resources. In certain embodiments, the method may comprise configuring the UE to prioritize dedicated RACH resources over the common RACH resources for performing random access.

In certain embodiments, the one or more criteria of the first set of criteria may comprise one or more of: a reference signal received power (RSRP) threshold; a reference signal received quality (RSRQ) threshold; and a signal-to-interference-plus-noise (SINR) threshold.

In certain embodiments, the beam associated with the network node may comprise an SSB.

In certain embodiments, the beam associated with the network node may comprise a CSI-RS resource.

In certain embodiments, the transmitted message may be a handover configuration message.

In certain embodiments, the transmitted message may be transmitted in response to the UE detecting a beam failure.

In certain embodiments, the method may further comprise transmitting a random access response message to the UE.

In certain embodiments, the network node may be a target network node.

Also disclosed is a network node. The network node comprises a receiver, a transmitter, and processing circuitry coupled to the receiver and the transmitter. The processing circuitry is configured to transmit a message to a UE, the message comprising information about one or more sets of dedicated RACH resources, each set of dedicated RACH resources associated with a beam associated with the network node. The processing circuitry is configured to perform random access with the UE based on whether any beam associated with the one or more sets of dedicated RACH resources meets one or more criteria of a first set of criteria for performing random access.

Also disclosed is a computer program, the computer program comprising instructions configured to perform the above-described method in a network node.

Also disclosed is a computer program product, the computer program product comprising a non-transitory computer-readable storage medium, the non-transitory computer readable storage medium comprising a computer program comprising computer-executable instructions which, when executed on a processor, are configured to perform the above-described method in a network node.

Certain embodiments of the present disclosure may provide one or more technical advantages. As one example, certain embodiments may advantageously enable a UE to perform contention-free random access or contention-based random access as long as T304 timer is not expired and hence avoid failure. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1A:
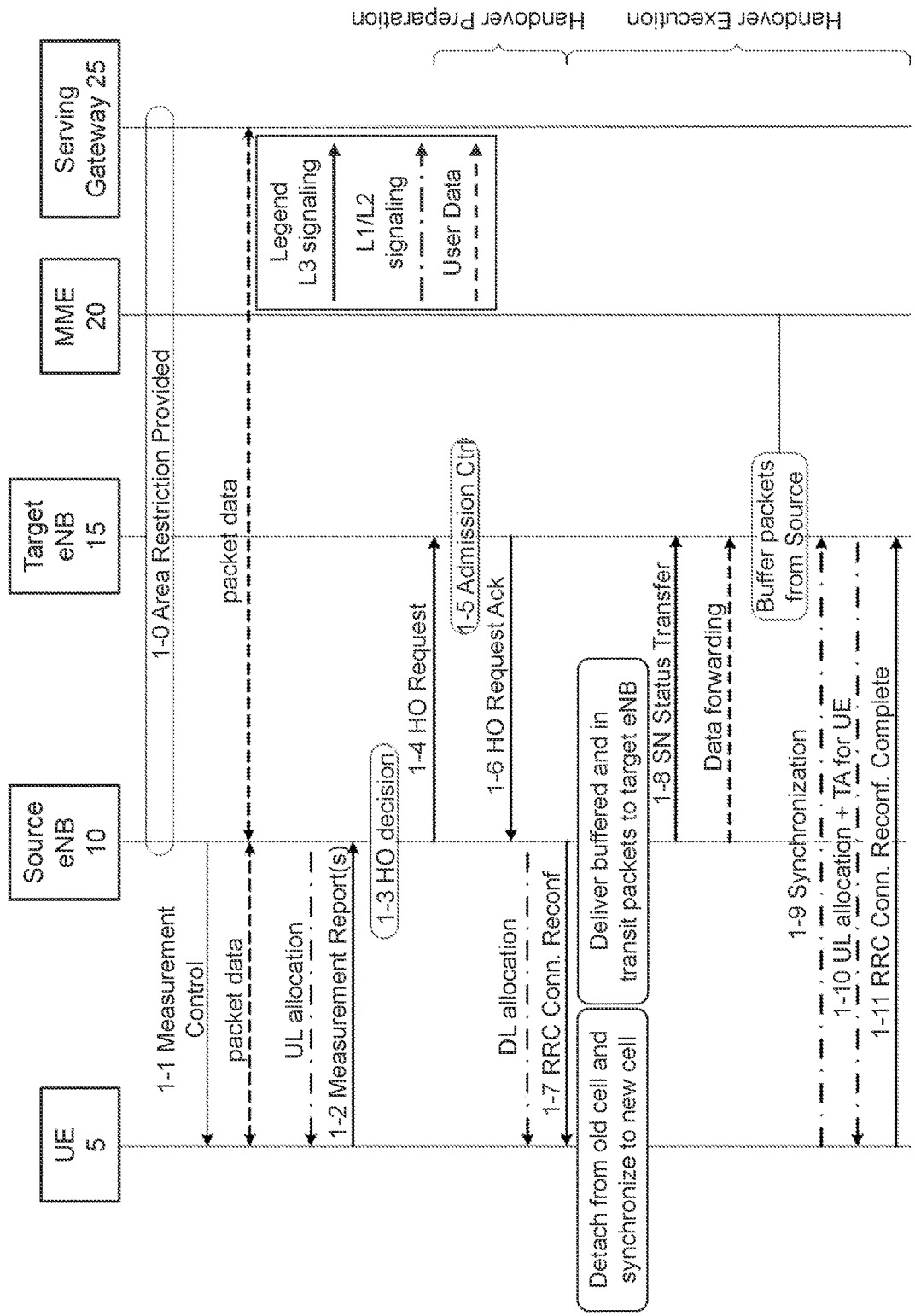
FIGS. 1A and 1B illustrate handover as described in 3GPP TS 36.300.
Figure 1B:
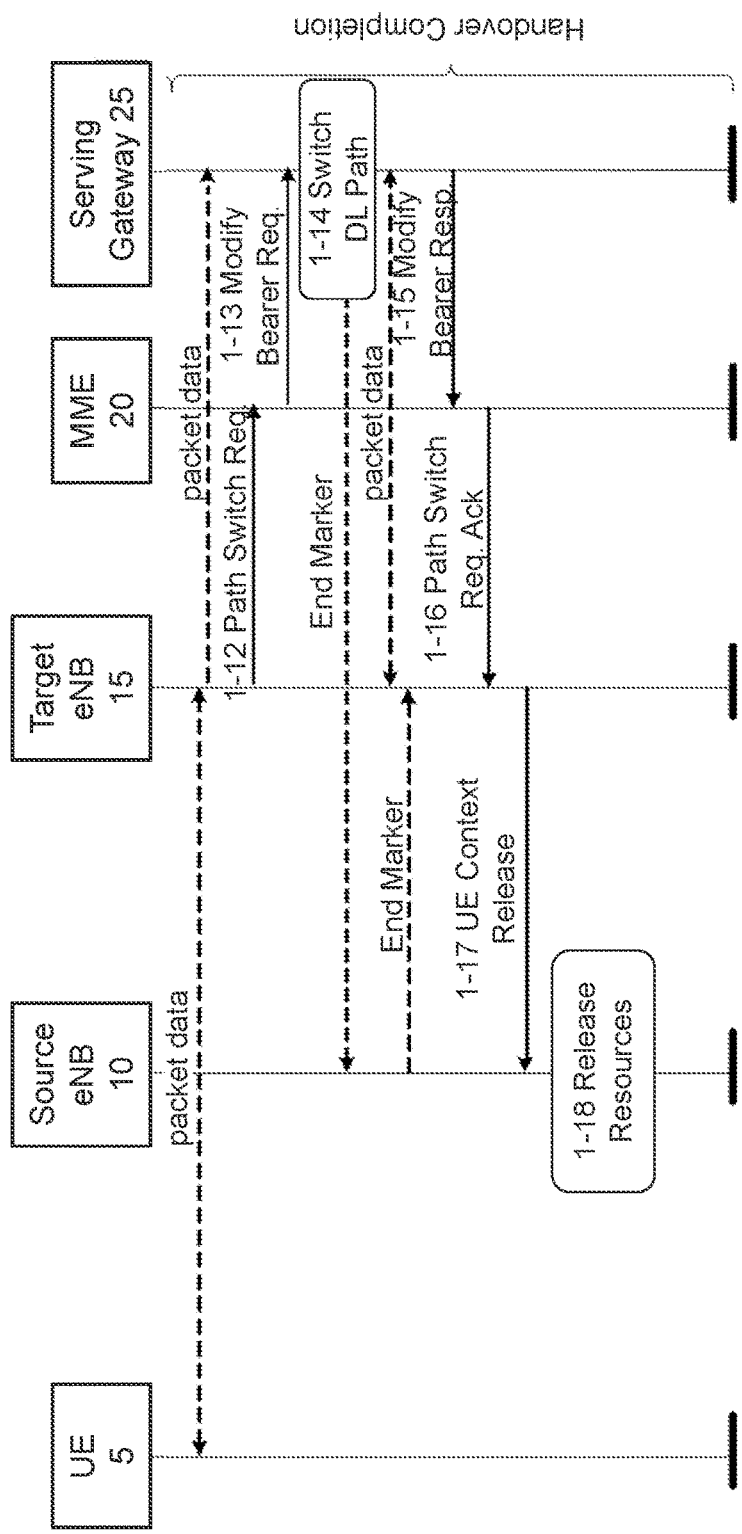
Figure 2:
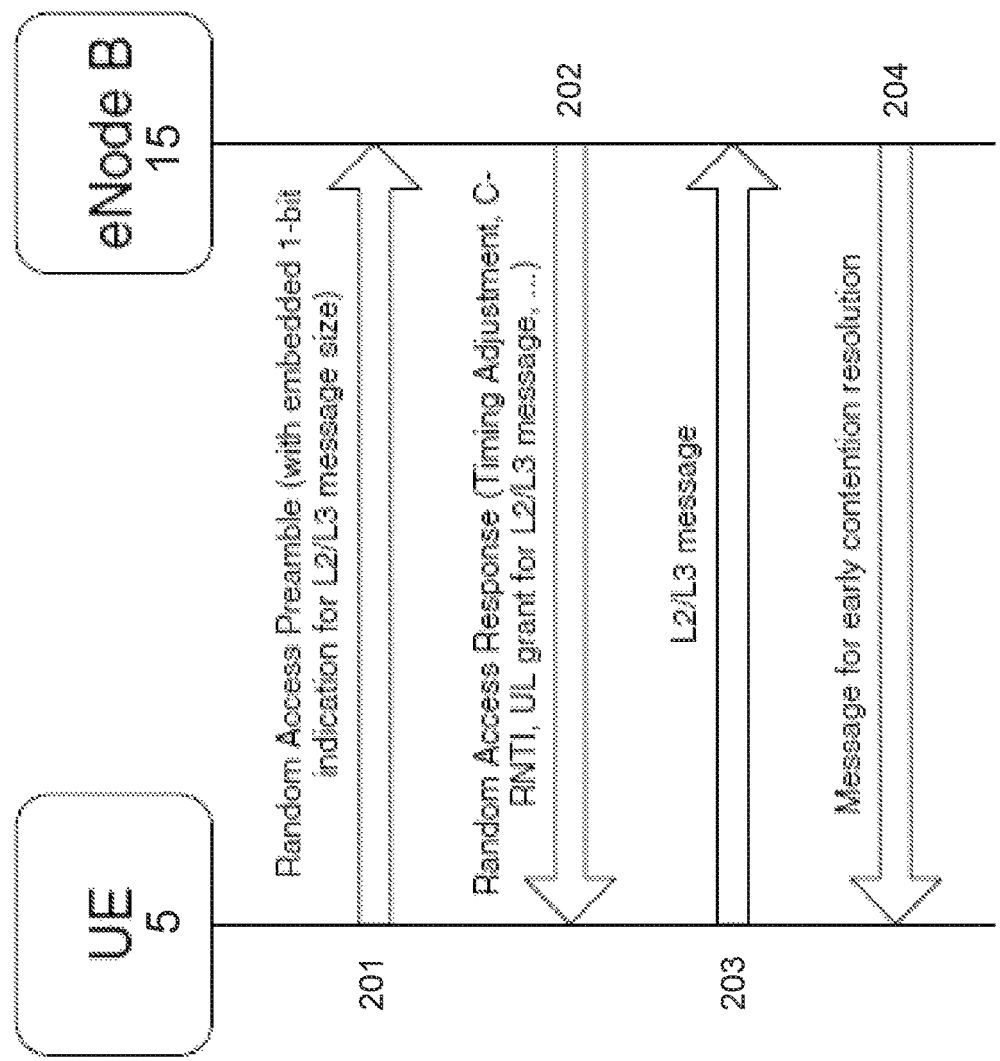
FIG. 2 illustrates an example of a contention-based random access procedure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As described above, there are some aspects of NR that differ from LTE. These differences impact UE behavior during random access. One change is that in each NR cell there can be multiple Synchronization Signal Blocks (SSBs) sets comprised of one or multiple SSBs that can be transmitted in different beams (or directions). For each of these directions there can be some differences in the PRACH resource configuration. Hence, in NR, before initiating random access the UE performs beam selection (or SSB selection) within a cell to derive the PRACH resources that should be used (such as time/frequency resources and sequence(s)).

It has been agreed that each cell can beamform additional reference signals (e.g., CSI-RS) in different beams and provide the UE with a mapping between PRACH resources and CSI-RS so that the beam selection can be performed based on CSI-RS at least during handover. Additionally, the following agreements were taken in the following RAN1 meetings concerning the RACH procedure in connected mode and for New Radio (NR).

At RAN1 #86bis, the following agreements were reached.

It was agreed that when Transmit (Tx)/Receive (Rx) reciprocity is available at the gNodeB (gNB) at least for multiple beams operation, the following RACH procedure is considered for at least UE in idle mode. First, association between one or multiple occasions for DL broadcast channel/signal and a subset of RACH resources is informed to UE by broadcast system information or known to UE. It is for further study (FFS) the signaling of "non-association." Likewise, detailed design for RACH preamble should be further studied. Second, based on the DL measurement and the corresponding association, the UE selects the subset of RACH resources. It is for further study whether Tx beam selection for RACH preamble transmission. Third, at the gNB, the DL Tx beam for the UE can be obtained based on the detected RACH preamble and would be also applied to Message 2. The UL grant in message 2 may indicate the transmission timing of MSG.3. For the cases with and without Tx/Rx reciprocity, the common random access procedure should be strived for. Fourth, when Tx/Rx reciprocity is not available, the following could be further considered for at least UE in idle mode: (1) whether or how to report DL Tx beam to the gNB (e.g., RACH preamble/resource, Msg. 3); and (2) whether or how to indicate UL Tx beam to the UE (e.g., RAR).

Additionally, RAN1 is studying the potential benefits of a simplified RACH procedure consisting of two main steps (Msg1 and Msg2) for UEs. In particular, RAN1 has discussed the following: (1) the use of a UE identity in Msg 1; and (2) Msg 2: random access response that is addressed to the UE identity in Msg 1. The definition and choice of the UE identity and the scenarios to which the simplified RACH procedure may be applicable are FFS.

Additionally, agreements were reached with respect to the RACH resource (i.e., a time-frequency resource to send the RACH preamble) and that whether the UE needs to transmit one or multiple/repeated preamble within a subset of RACH resources can be informed by broadcast system information. For example, to cover gNB RX beam sweeping in case of NO Tx/Rx reciprocity at the gNB Additionally, it was further agreed that NR supports multiple RACH preamble formats, including at least: RACH preamble format with longer preamble length; and RACH preamble format with shorter preamble length. The issue of how many signatures (e.g. number of RACH sequences, payload size, etc.) is for further study. It was further agreed that multiple/repeated RACH preambles in a RACH resource is supported. The issues of how to support single-beam and/or multi-beam operation and whether the preamble could be the same or different are for further study. It was further agreed that the numerology for RACH preamble can be different depending on frequency ranges (it is FFS how many numerologies will be supported per frequency range) and that the numerology for the RACH preamble can be different or the same from that for the other UL data/control channels.

Additionally, it was agreed that in the evaluation for RACH preamble transmission and RACH resource selection, companies report the following assumptions: support of Rx beam sweeping at the base station; and support of coverage (e.g., the values defined in 3GPP TR 38.913).

At RAN1 #87, the following agreements were reached.

It was agreed that the following options can be further considered for the consecutive multiple/repeated RACH preambles. Option 1: Cyclic Prefix (CP) is inserted at the beginning of the consecutive multiple/repeated RACH sequences, CP/Guard Time (GT) between RACH sequences is omitted and GT is reserved at the end of the consecutive multiple/repeated RACH sequences. Option 2: the same RACH sequences with CP is used and GT is reserved at the end of the consecutive multiple/repeated RACH sequences. Option 3: the same RACH sequences with CP/GT is used. Option 4: different RACH sequences with CP is used and GT is reserved at the end of the consecutive multiple/repeated RACH sequences. Option 5: different RACH sequences with CP/GT is used. For Options 2 and 3, it was agreed to study further whether the same RACH sequences with and without GT can be further multiplied with different orthogonal cover codes and transmitted. For example, the consecutive multiple/repeated RACH preambles would be used when Tx/Rx beam correspondence does not hold at Transmission Reception Point (TRP). Other options are not precluded.

It was further agreed that for a single RACH preamble transmission, CP/GT are required. For example, the single RACH preamble would be used when Tx/Rx beam correspondence held at both TRP or UE for multi-beam operation.

It was further agreed that the maximum bandwidth for a RACH preamble transmission is not wider than 5 MHz for a carrier frequency of below 6 GHz and not wider than X MHz for a carrier frequency ranging from 6 GHz to 52.6 GHz. X will be down selected from 5, 10, and 20 MHz. It was further agreed that at least one reference numerology for RACH preamble is defined, 1.25×n kHz and 15×n kHz (integer value of n is for further study). Other values are not precluded. It was further agreed that, based on the reference numerology for RACH preamble, multiple RACH preambles with scalable numerologies are supported depending on the carrier frequency.

It was further agreed that the following sequences can be considered for the evaluation: Zadoff-Chu (ZC) sequence and m-sequence. However, other sequences are not precluded.

At RAN1 NR AdHoc #1, the following was agreed to.

The following next steps were agreed to. For down selection purpose, until the next meeting do evaluation of the following RACH Subcarrier Spacing (SCS) alternatives at least considering: robustness towards Doppler frequency; beam sweeping latency; link budget; cell size; RACH capacity; and frequency offset. The RACH SCS alternatives include: SCS=[1.25 2.5 5 7.5 10 15 20 30 60 120 240] kHz. Note that in case RACH SCS=[15 30 60 120 240], there are two design options: (1) use the same SCS as the subsequent UL data and control; and (2) use different SCS than the subsequent UL data and control. Additionally, the following RACH preamble sequence types are considered: Zadoff-Chu; M-sequence; Zadoff-Chu with cover extension using M-sequence. Note that new designs are not precluded in the future.

For single/multi-beam operation, the following was agreed to. For multiple/repeated RACH preamble transmissions, consider only option 1, option 2 and option 4. Option 1: CP is inserted at the beginning of the consecutive multiple/repeated RACH OFDM symbols, CP/GT between RACH symbols is omitted, and GT is reserved at the end of the consecutive multiple/repeated RACH symbols. Option 2/4: The same/different RACH sequences with CP is used and GT is reserved at the end of the consecutive multiple/repeated RACH sequences. It is for further study whether to perform multiplexing with different orthogonal cover codes and whether to use independent RACH sequences in a RACH preamble. It was further agreed that for supporting various coverage and forward compatibility, flexibility in the length of CP/GT and the number of repeated RACH preambles and RACH symbols is supported. Note that specific use of these three options may depend on RACH subcarrier spacing and TRP beam correspondence Additionally, NR defines that: (1) a random access preamble format consists of one or multiple random access preamble(s); (2) a random access preamble consists of one preamble sequence plus CP; and (3) one preamble sequence consists of one or multiple RACH OFDM symbol(s). It was further agreed that the UE transmits PRACH according to the configured random access preamble format.

Additionally, for the 4-step RACH procedure, it was agreed that a RACH transmission occasion is defined as the time-frequency resource on which a PRACH message 1 is transmitted using the configured PRACH preamble format with a single particular Tx beam.

Additionally, for the 4-step RACH procedure, it was agreed that: (1) NR at least supports transmission of a single Msg.1 before the end of a monitored RAR window; and (2) the NR 4-step RACH procedure design should not preclude multiple Msg.1 transmissions until the end of RAR window if need arises.

Additionally, for NR RACH Msg. 1 retransmission (at least for multi-beam operation), it was agreed that NR supports power ramping. If the UE conducts beam switching, the working assumption that one of the alternatives described below will be selected (configurability between multiple alternatives may be considered if clear benefit is shown). Alternative 1: the counter of power ramping is re-set. Alternative 2: the counter of power ramping remains unchanged. Alternative 3: the counter of power ramping keeps increasing. Other alternatives or combinations of the above are not precluded. If UE doesn't change beam, the counter of power ramping keeps increasing. Note that the UE may derive the UL transmit power using the most recent estimate of path loss. The detail of power ramping step size is FFS. It was further agreed that whether the UE performs UL Beam switching during retransmissions is up to UE implementation. Note that which beam the UE switches to is up to UE implementation.

At RAN1 #88, the following agreements were reached.

Regarding multiple/repeated PRACH preamble formats, NR at least supports Option 1. RAN1 studies other options and consider option 1 as baseline for comparison with other options. For RACH capacity enhancements, Option 2 with/without Orthogonal Cover Code (OCC) and/or Option 4 with different sequences can be considered. Note that for Option 4, it was agreed that the combination with different sequences can be studied. Note also that for Option 4, it was agreed that two-stage or multiple-stage UE detection can be studied for possible complexity reduction for PRACH detection. It was further agreed that all options will consider beam switching time. It was agreed that the number of preambles/symbols and length of CP/GT is FFS. Additionally, it was agreed that the region for PRACH transmission should be aligned to the boundary of UL symbol/slot/subframe.

It was further agreed to evaluate designs considering possibility to have a larger number of PRACH preamble sequences in a RACH transmission occasion than in LTE. It was agreed that the following methods can be considered for evaluations: Zadoff-Chu with cover extension using M-sequence; M-sequences; and Zadoff-Chu sequence. Note that other methods are not precluded. Additionally, it was agreed that the peak to average power ratio (PAPR) and false alarm of these different sequences should also be evaluated.

For PUSCH (re)transmissions corresponding to a RAR grant, it was further agreed to study the following alternatives. Alternative 1: the UL waveform(s) is fixed in the specifications. Note that the UL waveform is either DFT-S-OFDM or CP-OFDM. Alternative 2: the network informs a UE whether to use DFT-S-OFDM or CP-OFDM (note that the signalling method is FFS). It was further agreed that other alternatives are not precluded.

For contention-free random access, it was agreed that the following options are under evaluation. Option 1: transmission of only a single Msg.1 before the end of a monitored RAR window. Option 2: a UE can be configured to transmit multiple simultaneous Msg.1. Note that multiple simultaneous Msg.1 transmissions use different frequency resources and/or use the same frequency resource with different preamble indices. Option 3: a UE can be configured to transmit multiple Msg.1 over multiple RACH transmission occasions in the time domain before the end of a monitored RAR window.

It was further agreed that the following is baseline UE behaviour. The UE assumes single RAR reception at a UE within a given RAR window. The NR random access design should not preclude UE reception of multiple RAR within a given RAR window, if the need arises.

It was further agreed that, at least for the case without gNB Tx/Rx beam correspondence, the gNB can configure an association between DL signal/channel, and a subset of RACH resources and/or a subset of preamble indices, for determining Msg2 DL Tx beam. Based on the DL measurement and the corresponding association, the UE selects the subset of RACH resources and/or the subset of RACH preamble indices. A preamble index consists of preamble sequence index and OCC index, if OCC is supported. Note that a subset of preambles can be indicated by OCC indices.

At RAN1 #88 bis, the following agreements were reached.

It was agreed that NR RACH capacity shall be at least as high as in LTE. Such capacity is achieved by time/code/frequency multiplexing for a given total amount of time/frequency resources. It was further agreed that the Zadoff-Chu sequence is adopted in NR. The use of another sequence type and/or other methods in addition to Zadoff-Chu sequence for the scenario, for example, of high speed and large cells is FFS. Similarly, the definition of large cell and high speed is FFS. Also FFS is the use of other sequence type and/or other methods for capacity enhancements. For example, at least in multi-beam and low speed scenario, regarding multiple/repeated PRACH preamble formats, option 2 with OCC across preambles. In particular, the use of Option 2 with OCC across multiple/repeated preambles in high speed scenarios is FFS. As another example, PRACH preamble design composed with multiple different ZC sequences. As another example, sinusoidal modulation on top of Option 1.

For Zadoff-Chu sequence type, it was further agreed that the RAN1 specifications will support two NR-PRACH sequence lengths (L), where:

L=839: SCS=11.25, 2.5, 51 KHz, and one of:

L=63/71: SCS={15, 30, 60, 120, 240} KHz and

L=127/139: SCS={7.5, 15, 30, 60, 120} KHz is selected. It was further agreed that the supported SCSs for each sequence length and for other sequence types is FFS.

It was further agreed that the waveform for RACH MSG.3 can be DFT-S-OFDM or CP-OFDM. It was agreed that the network signals (directly or indirectly) the RACH message 3 waveform to the UE, and that the network signals the waveform for RACH MSG.3 in the remaining minimum System Information (SI) as one bit.

It was further agreed that in NR, the RACH configuration provides at least: (1) RACH time/frequency information; and (2) the RACH preamble format.

It was further agreed that association between one or multiple occasions for Synchronization Signal (SS) block and a subset of RACH resources and/or subset of preamble indices is informed to the UE by broadcast SI or known to UE or FFS dedicated signalling. Whether the gNB can configure an association between Channel State Information Reference Signal (CSI-RS) for L3 mobility and a subset of RACH resources and/or a subset of preamble indices for determining Msg2 DL Tx beam is FFS.

It was further agreed that NR supports an indication of the PRACH resource allocation for non-contention based random access for a UE. How the PRACH resource is indicated for the UE is FFS. Note that PRACH resource may refer to time, frequency, and/or code resources of the PRACH preamble.

It was further agreed that for NR RACH Msg. 1 retransmission (at least for multi-beam operation) NR supports power ramping. If the UE conducts beam switching, the working assumption is that one of the alternatives described below will be selected (configurability between multiple alternatives may be considered if clear benefit is shown).

Alternative 1: the counter of power ramping is re-set. Alternative 2: the counter of power ramping remains unchanged. Alternative 3: the counter of power ramping keeps increasing. Alternative 4: as proposed on slide 4 and illustrated on slide 5 in 3GPP R1-1706613. Other alternatives or combinations of the above are not precluded.

It was further agreed that if the UE doesn't change beam, the counter of power ramping keeps increasing. Note that the UE may derive the UL transmit power using the most recent estimate of path loss. The detail of power ramping step size is FFS. It was further agreed that whether the UE performs UL Beam switching during retransmissions is up to UE implementation. Note that which beam the UE switches to is up to UE implementation.

At RAN1 #89, the following agreements were reached.

It was agreed that NR supports PRACH preamble formats 0 and 1 for the sequence length of 839 (as shown in Table 1 below).

TABLE 1

| Format | L | SCS (kHz) | BW (MHz) | N_OS | N_RP | T_SEQ (Ts) | T_CP (Ts) | T_GP (Ts) | Use case |
|---|---|---|---|---|---|---|---|---|---|
| 0 | 839 | 1.25 | 1.08 | 1 | 1 | 24576 | 3168 | 2975 | LTE refarming |
| 1 | 839 | 1.25 | 1.08 | 2 | 1 | 2*24576 | 21024 | 21904 | Large cell, Up to 100 km |

The working assumption is that NR supports PRACH preamble format indicated in Table 2 below for the sequence length of 839. The restricted set and the use of other sequence(s) for large cell radius are FFS.

TABLE 2

| Format | L | SCS (kHz) | BW (MHz) | N_OS | N_RP | T_SEQ (Ts) | T_CP (Ts) | T_GP (Ts) | Use case |
|---|---|---|---|---|---|---|---|---|---|
| 3 (1 ms) | 839 | 5 | 4.32 | 4 | 1 | 4*6144 | 3168 | 2976 | High speed case |

In the R1-1709708 WF on NR-RACH preamble format for coverage enhancement ZTE, CMCC proposed introducing a PRACH preamble format that provides 3 dB MCL gain compared to LTE PRACH preamble format 2 (as shown in Table 3 below).

TABLE 3

| Format | L | SCS (kHz) | BW (MHz) | N_OS | N_RP | T_SEQ (Ts) | T_CP (Ts) | T_GP (Ts) | Use case |
|---|---|---|---|---|---|---|---|---|---|
| 4 (3.5 ms) | 839 | 1.25 | 1.08 | 4 | 1 | 4*24576 | 4688 | 4528 | Coverage enhancement |

Note that in Table 3, L is the sequence length and Ts=1/(30720) ms.

It was agreed that for L=839, NR at least supports subcarrier spacing of 1.25 kHz. It is FFS which one of 2.5 kHz or 5 kHz will be supported.

It was further agreed that for the shorter sequence length than L=839, NR supports sequence length of L=127 or 139 with SCS of {15, 30, 60, 120} kHz. Note that this is based on the assumption that 240 kHz SCS is not available for data/control. The use of 7.5 kHz subcarrier spacing is FFS.

It was further agreed to consider the following new use cases for RACH design: (1) beam recovery requests; and (2) on demand SI requests. In particular, it was agreed to study the following aspects: (1) requirements to satisfy the above new use cases; (2) the impact on capacity; (3) whether additional preamble format(s) is needed; and (4) the impact on RACH procedure.

It was further agreed that if the UE conducts beam switching, the counter of power ramping remains unchanged. The UE behavior after reaching the maximum power is FFS.

Additionally, it was agreed that NR does not support report UE capability of beam correspondence during the RACH procedure. Note that UE capability of beam correspondence is reported after the RACH procedure It was further agreed that the random access configuration is included in remaining minimum SI (RMSI). It was agreed to continue discussion on: (1) whether all random access configuration information is transmitted in all beams used for RMSI within a cell or not; (2) whether the network is mandated to use the same set of beams for RMSI and SS block or not; and (3) whether SS block and RMSI are spatial QCLed or not.

It was further agreed that RAN1 will study transmitting PRACH preambles in CONNECTED mode in resources based on CSI-RS. The use cases and configurations details based on CSI-RS are FFS.

At RAN1 NR AdHoc #2, the following agreements were reached.

The working assumption on supporting format 3 was confirmed. For formats with L=839, it was agreed that unrestricted sets are supported. It was further agreed that for restricted sets: (1) 1.25 kHz: restricted set A supported, Restricted set B is FFS; (2) 5 kHz: restricted set is supported with FFS if Restricted set A, B or both are supported. For L=127/139 with Option 1, it was agreed that formats with 1, 2, 4, 6, and 12 Orthogonal Frequency Division Multiplexing (OFDM) symbols are supported. It was further agreed that the number of symbols can be adjusted if problems are identified.

Additionally, for 15 kHz SCS, the following preamble formats were agreed to: A2, A3, B4. It was agreed that the working assumption was that the following preamble formats would also be supported: A0, A1, B0, B1, B2, B3, C0, C1.

TABLE 4

| Preamble format | | # of Sequence | TCP | TSEQ | TGP | Path profile (Ts) | Path profile (us) | Maximum Cell radius (meter) | Use case |
|---|---|---|---|---|---|---|---|---|---|
| A | 0 | 1 | 144 | 2048 | 0 | 48 | 1.56 | 469 | TA is already known or Very small cell |
|  | 1 | 2 | 288 | 4096 | 0 | 96 | 3.13 | 938 | Small cell |
|  | 2 | 4 | 576 | 8192 | 0 | 144 | 4.69 | 2,109 | Normal cell |
|  | 3 | 6 | 864 | 12288 | 0 | 144 | 4.69 | 3,516 | Normal cell |
| B | 0 | 1 | 144 | 2048 | 0 | 48 | 1.56 | 469 | TA is already known or Very small cell |
|  | 1 | 2 | 192 | 4096 | 96 | 96 | 3.13 | 469 | Small cell |
|  | 2 | 4 | 360 | 8192 | 216 | 144 | 4.69 | 1,055 | Normal cell |
|  | 3 | 6 | 504 | 12288 | 360 | 144 | 4.69 | 1,758 | Normal cell |
|  | 4 | 12 | 936 | 24576 | 792 | 144 | 4.69 | 3,867 | Normal cell |
| C | 0 | 1 | 1240 | 2048 | 0 | 144 | 4.69 | 5300 | Normal cell |
|  | 1 | 2 | 1384 | 4096 | 0 | 144 | 4.69 | 6000 | Normal cell |

In Table 4 above: (1) the unit is Ts, where Ts=1/30.72 MHz; (2) the PRACH preamble are aligned with OFDM symbol boundary for data with same numerology; (3) an additional 16 Ts for every 0.5 ms should be included in Time for the Cyclic Prefix (TCP) when RACH preamble is transmitted across 0.5 ms boundary or from 0.5 ms boundary; (4) for format A, GP can be defined within the last RACH preamble among consecutively transmitted RACH preambles.

For 30/60/120 kHz SCS, it was agreed that preamble format can be scaled according to subcarrier spacing. For example: (1) Ts=1/(2*30720) ms for 30 kHz SCS; (2) Ts=1/(4*30720) ms for 60 kHz SCS; (3) Ts=1/(8*30720) ms for 120 kHz SCS. Note that some of the formats may not be applicable to all SCSs.

Additionally, it was agreed that the UE calculates the PRACH transmit power for the retransmission at least based on the most recent estimate pathloss and power ramping. The pathloss is measured at least on the SS block associated with the PRACH resources/preamble subset. It was further agreed that with respect to UE behavior when reaching the maximum power, if the recalculated power is still at or above the Pc,max the UE can transmit at maximum power even if it changes its TX beam.

It was further agreed that all random access configuration information is broadcasted in all beams used for RMSI within a cell (i.e., RMSI information is common for all beams).

It was further agreed that, at least for handover case, a source cell can indicate in the handover command association between RACH resources and CSI-RS configuration(s); association between RACH resources and SS blocks; and/or a set of dedicated RACH resources (FFS: time/frequency/sequence). Note that the above CSI-RS configuration is UE-specifically configured.

It was further agreed that for the contention free case, a UE can be configured to transmit multiple Msg.1 over dedicated multiple RACH transmission occasions in time domain before the end of a monitored RAR window if the configuration of dedicated multiple RACH transmission occasions in time domain is supported. Note that the time resource used for "dedicated RACH in time domain" is different from the time resources of contention based random access. Note also that multiple Msg1 can be transmitted with same or different UE TX beams.

It was further agreed that for contention-based random access, an association between an SS block in the SS burst set and a subset of RACH resources and/or preamble indices is configured by a set of parameters in RMSI. In particular, RAN1 strives to use the same set of parameters for different cases (e.g., analog/hybrid/digital beamforming at gNB), level of gNB beam correspondence, number of SS blocks, number of frequency multiplexed PRACH resources, PRACH resource density in time, etc. Additionally, RAN1 strives to minimize the set of parameters. The set of parameters and the number of SS blocks (if indicated in RMSI or MIB) (e.g., the actually transmitted SS blocks or the maximum number (L)) are FFS.

At RAN1 #90, the following agreements were reached.

It was agreed that for NR PRACH preamble L=839 with SCS=1.25 kHz, Ncs restricted set type B is supported in addition to restricted set type A. It was further agreed that for NR PRACH preamble L=839 with SCS 5 kHz, Ncs restricted set type A and type B are supported.

It was agreed to at least confirm the working assumption for preamble formats A1, B1, B2, B3. It was further agreed not to define preamble format B0, and to change TCP value from 192 to 216 and the Time for the Guard Period (TGP) value from 96 to 72 for format B1.

Additionally, it was agreed that RACH preamble formats with L=839 are not supported in over-6 GHz band, and are supported in below-6 GHz band. It was further agreed that for short sequence (L=127/139) based preamble formats, RACH transmission at over-6 GHz band: (1) supports 60 and 120 kHz subcarrier spacing; and (2) does not support 15 and 30 kHz SCS. It was further agreed that for short sequence (L=127/139) based preamble formats, RACH transmission at below-6 GHz band: (1) supports 15 and 30 kHz subcarrier spacing; and (2) does not support 60 and 120 kHz subcarrier spacing.

It was further agreed that preamble formats for PRACH with short sequence length support preamble formats A0, C0 and C2 in addition to the agreed formats A1, A2, A3, B1, B2, B3 and B4.

TABLE 5

| Preamble Format | # of seq. | TCP | TSEQ | TGP | Path Profile (Ts) | Path Profile (us) | Max cell radius (m) | Use case |
| --- | --- | --- | --- | --- | --- | --- | --- | --- |
| C0 | 1 | 1240 | 2048 | 1096 | 144 | 4.69 | 5300 (660 in case of 120 kHz SCS) | Normal cell |
| C2 | 4 | 2048 | 8192 | 2916 | 144 | 4.69 | 9200 (1160 in case of 120 kHz SCS) | Normal cell |

It was further agreed that the same cyclic shift values as defined in LTE are applied for NR PRACH preamble format 0 and 1. Whether the same cyclic shift values as defined in LTE can be applied for NR PRACH preamble format 2 and 3, considering parameters (e.g. delay spread, guard time, filter length, etc.) is FFS.

It was further agreed that it is up to UE implementation how to select the SS block and corresponding PRACH resource for path-loss estimation and (re)transmission based on SS blocks that satisfy threshold(s). If the UE does not detect a SS block that satisfy threshold(s), it has the flexibility to select any SS block that allows UE to meet the target received power of the RACH preamble with its maximum transmit power. The UE has a flexibility to select its RX beam to find the list of SS blocks that satisfy the threshold(s). It is FFS whether threshold(s) for SS block selection is configured or fixed in the spec. It was agreed that the counter of power ramping when UE changes its selected SS-block in message 1 re-transmission is unchanged.

Additionally, it was agreed that the UE computes pathloss based on "SS block transmit power" and SS block RSRP. At least one "SS block transmit power" value is indicated to the UE in RMSI. It is FFS whether and how to support multiple values. Note that different SS blocks in an SS burst set can be transmitted with different power and/or with different Tx beamforming gain at least as network implementation.

It was further agreed that NR supports the total maximum number of transmissions, M (like LTE), per carrier to indicate random access problem, and that M is a network-configurable parameter.

Additionally, it was agreed that, at least for initial access, the RAR is carried in NR-PDSCH scheduled by NR-PDCCH in CORESET configured in RACH configuration. Note that the CORESET configured in RACH configuration can be the same or different from the CORESET configured in NR-Physical Broadcast Channel (NR-PBCH).

It was further agreed that for single Msg1 RACH, the RAR window starts from the first available CORESET after a fixed duration from the end of Msg1 transmission. The fixed duration is X T_s, where X is the same for all RACH occasions. Whether the CORESET starting position is aligned with slot boundary is FFS, as is the value of X and whether X is frequency range dependent.

It was further agreed that for a single Msg1 RACH from the UE, the size of a RAR window is the same for all RACH occasions and is configured in RMSI, and the RAR window could accommodate processing time at gNB. The maximum window size depends on worst case gNB delay after Msg1 reception including processing delay, scheduling delay, etc. The minimum window size depends on duration of Msg2 or CORESET and scheduling delay.

It was further agreed that for initial access, either long sequence based preamble or short sequence based preamble is configured in a RACH configuration.

Additionally, it was agreed that for contention-based NR4-step random access procedure: the SCS for Msg 1 is configured in the RACH configuration; the SCS for Msg 2 is the same as the numerology of RMSI; the SCS for Msg 3 is configured in the RACH configuration separately from SCS for Msg1; and the SCS for Msg 4 is the same as in Msg.2. For contention-free RA procedure for handover, the SCS for Msg1 and the SCS for Msg2 are provided in the handover command.

It was further agreed that NR studies: (1) reporting of SS block index (e.g., strongest SS block index) through Msg3 of contention based random access; and (2) reporting of multiple SS block indices through Msg1 of contention free random access procedure (e.g., network can assign multiple RACH transmission times and RACH preambles to the UE). The UE can convey one SS block index by selecting a RACH transmission time and another SS block index implicitly by selecting a RACH preamble).

In RAN1 NR AdHoc #3, the following agreements were reached.

It was agreed that for format 2, the same cyclic shift values as for format 0 and 1 are used. A working assumption that L=139 is adopted as the sequence length for the RACH Preamble Formats using the short sequence.

It was agreed to use one common table for cyclic shift (Ncs) values for short sequence based PRACH formats for all SCS. Alternative 1 is that the number of cyclic shift values is up to 16 values represented by 4 bits. Alternative 2 is that the number of cyclic shift values is up to 8 values represented by 3 bits.

It was further agreed that for format 3, Table 6 below would be used. The underlined values are working assumption.

TABLE 6

| | Sequence length 839, SCS = 5 KHz | | |
|---|---|---|---|
| ZeroCorrelation ZoneConfig | Unrestricted | Restricted set type A | Restricted set type B |
| 0 | 0 | 36 | 36 |
| 1 | 13 | 57 | 57 |
| 2 | 26 | 72 | 60 |
| 3 | 33 | 81 | 63 |
| 4 | 38 | 89 | 65 |
| 5 | 41 | 94 | 68 |
| 6 | 49 | 103 | 71 |
| 7 | 55 | 112 | 77 |
| 8 | 64 | 121 | 81 |
| 9 | 76 | 132 | 85 |
| 10 | 93 | 137 | 97 |
| 11 | 119 | 152 | 109 |
| 12 | 139 | 173 | 122 |
| 13 | 209 | 195 | 137 |
| 14 | 279 | 216 | — |
| 15 | 419 | 237 | — |

It was further agreed that restricted set is not supported for NR PRACH preamble based on short sequence length. It was agreed to use one common table for cyclic shift (Ncs) values for short sequence based PRACH formats for all SCS. The number of cyclic shift values is up to 16 values represented by 4 bits, and Table 7 below was adopted.

TABLE 7

| ZeroCorrelationZoneConfig | Ncs values |
|---|---|
| 0 | 0 |
| 1 | 2 |
| 2 | 4 |
| 3 | 6 |
| 4 | 8 |
| 5 | 10 |
| 6 | 12 |
| 7 | 13 |
| 8 | 15 |
| 9 | 17 |
| 10 | 19 |
| 11 | 23 |
| 12 | 27 |
| 13 | 34 |
| 14 | 46 |
| 15 | 69 |

It was further agreed that NR defines the pattern of the slots that contain PRACH resource(s) in to a larger time interval. The time interval (e.g., 5/10/20 ms), pattern, and numerology of the slot (e.g., SS block, UL/DL, Msg1 or PUSCH) are FFS. Also for FFS is whether, within each slot the RACH resources are consecutive. Alternative 1 is that RACH resources within a slot are consecutive. Alternative 2 is that RACH resources within a slot are not consecutive (e.g., to handle the case of CORESET monitoring in the 2/4/7 symbols).

It was further agreed that, at least for initial access: (1) the PDSCH for RAR is confined within NR UE minimum DL bandwidth for a given frequency band; and (2) the PDSCH for Msg4 is confined within NR UE minimum DL BW for a given frequency band. It is FFS whether PDSCH for RAR and Msg4 are confined within initial active DL bandwidth.

Additionally, it was agreed to send an LS to RAN4 informing tone spacing and bandwidth of different RACH preamble formats. Check if these RACH preamble formats are confined within UE's minimum UL bandwidth.

It was further agreed that, at least for initial access, the association between SS blocks and RACH preamble indices and/or RACH resources is based on the actually transmitted SS blocks indicated in RMSI.

It was further agreed that for RAR, X can be supported for the timing gap between the end of MSg1 transmission and the starting position of the CORESET for RAR. It was agreed that the value of X=ceiling(Δ/(symbol duration))*symbol duration, where the symbol duration is based on the RAR numerology, and where A is to accommodate sufficient time for UE Tx-Rx switching if needed (e.g., for TDD).

It was further agreed that RMSI indicates only a single transmit power for SS blocks in Rel-15. Additionally, for initial access, it was agreed that the threshold for SS block selection for RACH resource association is configurable by the network, where the threshold is based on RSRP. The details, including ping-pong effect handling, are FFS.

Additionally, it was agreed that NR supports at least slot based transmission of Msg2, Msg3 and Msg4.

It was also agreed that Msg3 is scheduled by the UL grant in RAR, and that Msg3 is transmitted after a minimum time gap from the end of Msg2 over-the-air reception. The gNB has the flexibility to schedule the transmission time of Msg3 while ensuring the minimum time gap. The minimum time gap with respect to UE processing capability is for further study.

A number of topics remain FFS. As one example, whether Message 2 PDCCH/PDSCH is received by the UE assuming that the PDCCH/PDSCH DMRS conveying message 2 is quasi-co-located (QCL'ed) with the SS block which the preamble/RACH occasion the UE sent is associated to. As another example, whether Message 3 is transmitted by the UE assuming that the same Rx beam as was used for PRACH preamble reception by gNB to which the received RAR is associated to. As still another example, it is FFS whether, if there is no beam reporting in RACH message 3, Message 4 PDCCH/PDSCH is received by the UE assuming that the PDCCH/PDSCH Demodulation Reference Signal (DMRS) conveying message 4 is QCL'ed with that of Msg 2. As yet another example, it is FFS whether there is beam reporting in RACH message 3. As another example, it is FFS if and how beam reporting in RACH message 3 impacts message 4 Tx QCL assumption.

Despite all the RAN1 agreements related to RACH procedure, retransmissions via power ramping/beam switching, and the handling of measurements for UL power estimation, nothing has been agreed concerning the relation between the usage of dedicated resources or common RACH resources, other than the high-level principle that dedicated RACH resources, if provided, are prioritized over common RACH resources and the UE is not forbidden from attempting to access using common RACH resources before declaring HO failure based on T304 timer expiry (as agreed in RAN2 #99).

Despite the agreement on that high-level principle, it remains unclear what would be the UE actions depending on different error cases, or, in other words, how should the UE perform that prioritization, especially in different error cases, such as when the UE cannot find a beam with dedicated resource. Also, it has not been agreed what the UE should do in the different scenarios (e.g., if the UE receives dedicated resources for one SSB, for many SSBs, for one CSI-RS, for many CSI-RS, etc.).

Certain aspects of the present disclosure and their embodiments may provide solutions to these or other challenges. In certain embodiments, there is disclosed a beam selection method where the UE performs prioritization of contention-free random access resources per beam (i.e., per SSB and/or per CSI-RS resources), still allowing the UE to use contention-based random access resources to avoid a random access failure, which could result in, for example, handover failure. In certain embodiments, a beam selection configuration is used where the UE performs prioritization between contention-free random access resources per beam (i.e., per SSB and/or per CSI-RS resources), and contention-based random access resources per beam (i.e., per SSB and/or per CSI-RS resources).

As described herein, beam selection refers to one or a combination of the following: (1) selection of an SS/PBCH Block (SSB) associated to the cell the UE should synchronize to and perform random access; and (2) selection of as CSI-RS resource associated to the cell the UE should synchronize and perform random access.

According to one example embodiment, a method in a wireless device (e.g., a UE) is disclosed. The wireless device receives a message from a network node (e.g., a gNB). The message includes information about one or more sets of dedicated RACH resources. Each set of dedicated RACH resources may be associated with a beam associated with a target cell. The wireless device obtains an estimate of beam quality for each beam associated with the one or more sets of dedicated RACH resources. The wireless device determines, based on the obtained estimate of beam quality for each beam associated with the one or more sets of dedicated RACH resources, whether any beam associated with the one or more sets of dedicated RACH resources meets one or more criteria of a first set of criteria for performing random access. The wireless device performs random access based on whether any beam associated with the one or more sets of dedicated RACH resources meets the one or more criteria of the first set of criteria for performing random access.

According to another example embodiment, a method in a network node (e.g., a gNB) is disclosed. The network node transmits a message to a wireless device (e.g., a UE). The message includes information about one or more sets of dedicated RACH resources. Each set of dedicated RACH resources may be associated with a beam associated with the network node. The network node performs random access with the wireless device based on whether any beam associated with the one or more sets of dedicated RACH resources meets one or more criteria of a first set of criteria for performing random access.

Also disclosed herein are different embodiments detailing how the UE performs the prioritization, especially under the handling of different error cases and under different scenarios related to the RACH configuration (dedicated and common) provided to the UE.

Although certain embodiments may be described using handover as an example, the various embodiments described herein are applicable to any procedure relying on the usage of contention-free and contention-based access with beam selection (such as beam recovery).

Certain embodiments of the present disclosure may provide one or more technical advantages. As one example, certain embodiments may advantageously enable a UE to perform contention-free random access or contention-based random access as long as T304 timer is not expired and hence avoid failure. Other advantages may be readily apparent to one having skill in the art. Certain embodiments may have none, some, or all of the recited advantages.

Figure 3:
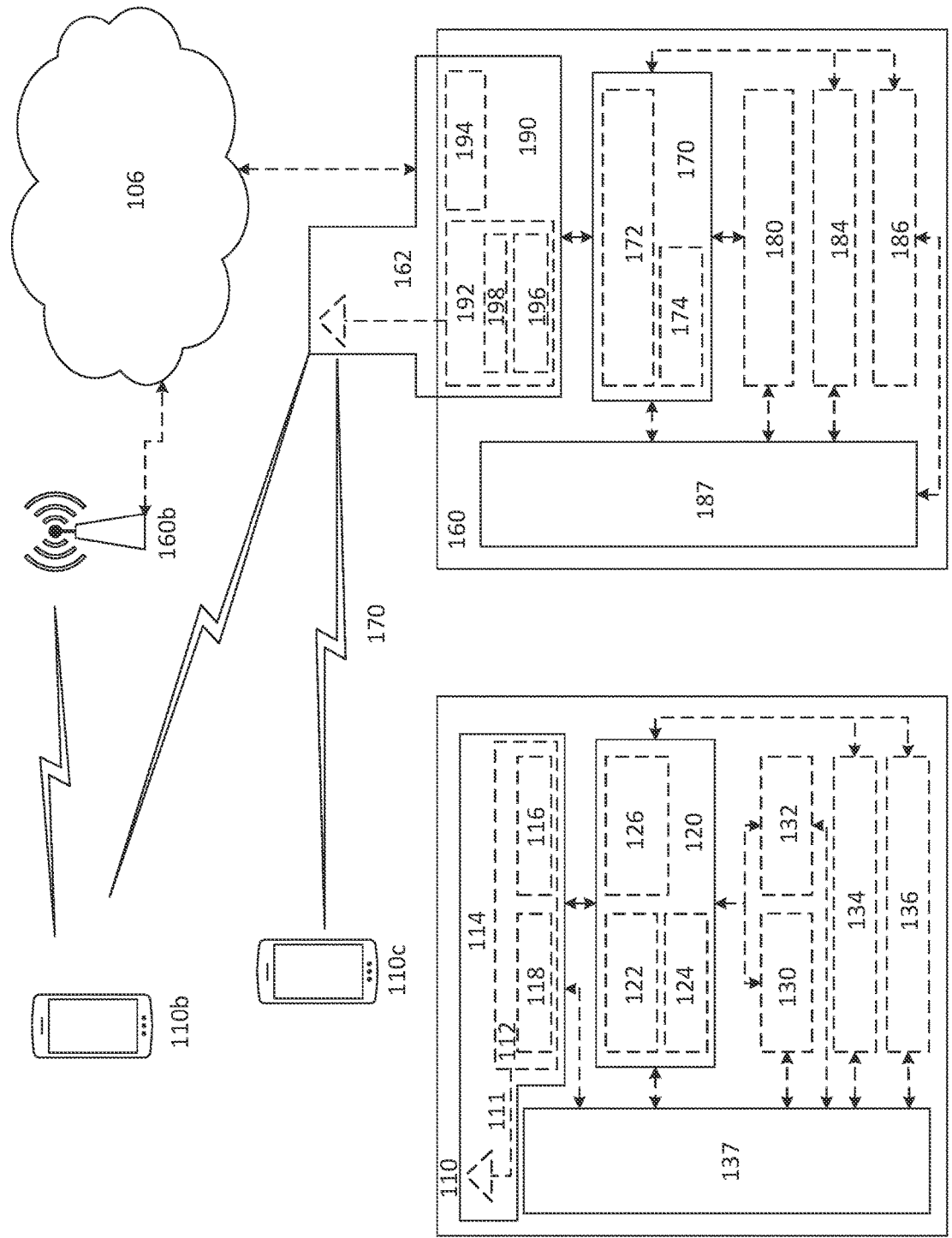
FIG. 3 illustrates an example wireless communications network, in accordance with certain embodiments.

FIG. 3 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and wireless devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

As described above, the present disclosure contemplates various embodiments for beam selection. As described in more detail below, in certain embodiments WD 110 performs prioritization of contention-free random access resources per beam (i.e., per SSB and/or per CSI-RS resources), still allowing WD 110 to use contention-based random access resources to avoid a random access failure, which could result in, for example, handover failure. In certain embodiments, a beam selection configuration is used where WD 110 performs prioritization between contention-free random access resources per beam (e.g., per SSB and/or per CSI-RS resources), and contention-based random access resources per beam (e.g., per SSB and/or per CSI-RS resources).

As described above, beam selection refers to one or a combination of the following: (1) selection of an SSB associated to the cell the UE should synchronize to and perform random access; and (2) selection of as CSI-RS resource associated to the cell the UE should synchronize and perform random access.

In certain embodiments, a message refers to an RRC signalling message. In the case of RRC, an example is the handover command (i.e., an RRCConnectionReconfiguration with a mobilityControlInfo IE containing the RACH configuration of the target cell). However, the various embodiments described herein are also applicable to any message from any protocol level triggering WD 110 to perform random access.

In certain embodiments, beam may refer to an SSB that is beamformed and that can be measured by WD 110 (e.g., WD 110 can compute SS-RSRP). Each SSB encodes a PCI and SSBs associated to the same NR cell transmit the same PCI. In addition, each SSB has its own SSB index, which can be derived from the DMRS of PBCH, a time index (e.g., encoded in PBCH) or a combination of these (as the combination can make a unique SSB identifier). In certain embodiments, beam may (alternatively or also) refer to a CSI-RS resource that is beamformed and can be measured by WD 110 (e.g., WD 110 can compute CSI-RSRP, CSI-RSRQ, CSI-SINR). Each CSI-RS may have a PCI associated to it so WD 110 can use for synchronization before it measures a CSI-RS resource.

In certain embodiments, measurement results per beam can be per beam RSRP, per beam RSRQ, and/or per beam SINR. In cases where SSB is used as the reference signal type for beam-level measurement, SS-RSRP, SS-RSRQ, SS-SINR may be used. In cases where CSI-RS is used as the reference signal type for beam-level measurement, CSI-RSRP, CSI-RSRQ, CSI-SINR may be used.

In certain embodiments, a suitable beam may be one whose measurement results fulfil a condition. For example, a suitable beam may be one whose measurement results fulfil a condition based on an absolute threshold. In certain embodiments, the absolute threshold can either be configurable or defined in the standard. For example, a beam $b(i)$ may be suitable if RSRP of $b(i)$>absolute threshold.

Other measurement quantities could also be used as the criteria, such as, for example, if RSRQ of $b(i)$>absolute threshold and/or if SINR of $b(i)$>absolute threshold. Combinations of measurement quantities could also be used as the criteria. For example, in certain embodiments if RSRQ of $b(i)$>absolute threshold 1 AND if SINR of $b(i)$>SINR absolute threshold 2 then $b(i)$ may be suitable. As another example, in certain embodiments if RSRP of $b(i)$>absolute threshold 1 AND if SINR of $b(i)$>absolute threshold 2, then $b(i)$ may be suitable. As still another example, in certain embodiments if RSRQ of $b(i)$>absolute threshold 1 AND if RSRP of $b(i)$>absolute threshold 2 then $b(i)$ may be suitable. As yet another example, in certain embodiments if RSRQ of $b(i)$>absolute threshold 1 AND if RSRP of $b(i)$>absolute threshold 2 AND if SINR of $b(i)$>absolute threshold 3 then $b(i)$ may be suitable. It should be understood that the above mathematical relations using greater than (>) are merely examples and other operators including, but not limited to, less than (<), less than or equal (≤), greater than or equal (≥), equal (=), not equal (≠) can also be considered. These operators can also be combined with logical operators, including but not limited to, AND, OR, XOR, NOT to form new mathematical relations.

In certain embodiments, target cell refers to a cell that WD 110 is being indicated to synchronize to during a handover that is different from any serving cell. In certain embodiments, the target cell could also be the same as any serving cell. One example of such a scenario is when WD 110 performs random access or equivalent procedure to re-gain synchronization with its serving cell before radio link failure is triggered, such as in beam selection during beam recovery. In some cases, however, even that procedure could also be configured to be performed in a different cell.

In certain embodiments, a network node, such as network node 160, transmits a message to WD 110. The message comprises information about one or more sets of dedicated RACH resources. Each set of dedicated RACH resources are associated with a beam associated with the network node. As described above, the message may be an RRC signalling message. For example the message may be a handover command (e.g., an RRCConnectionReconfiguration with a mobilityControlInfo IE containing the RACH configuration of the target cell). As described above, however, in certain embodiments it may be another message (e.g., another message triggering WD 110 to perform random access).

WD 110 receives the message from network node 160. In certain embodiments, in response to receiving the message, WD 110 obtains an estimate of beam quality for each beam associated with the one or more sets of dedicated RACH resources. For example, WD 110 may obtain an estimate of the beam quality per beam index associated to the target cell. In certain embodiments, this estimate may be obtained for all beams or only for a subset of beams.

WD 110 may obtain an estimate of beam quality for each beam associated with the one or more sets of dedicated RACH resources in a variety of ways. As a first example, WD 110 may use previously performed measurement results per beam index.

As a second example, WD 110 may update the measurement results per beam index for the target cell. In certain embodiments, the updated measurement results may be filtered measurement results. In other words, WD 110 may take into account previously performed measurements. In certain embodiments, the filter coefficient could either be defined or configured. In some cases, depending on the filter coefficients, only the latest sample(s) may matter (i.e., filter without memory). In certain embodiments, measurement update can occur in a faster periodicity compared to the one WD 110 uses for the configured event measurement evaluation considering that it may require more up to date measurement results to perform a proper random access procedure. In some cases, the usage of different sampling periodicities may be configured and/or adjusted based on different criteria (e.g., the detection of WD 110 movement, WD 110 speed or speed state, etc.). In certain embodiments, the sampling rate may depend on the physical properties of the radio channel (e.g., carrier frequency and SCS).

As a third example, in certain embodiments WD 110 may decide between using previously performed measurement results per beam index or perform an update of measurements based on one or more criteria. The one or more criteria may be any suitable criteria. In certain embodiments, the one or more criteria may include whether the latest measurement was performed more than a threshold amount of time (e.g., X ms) before the message was received by WD 110, which can indicate that the previously performed measurements are outdated and preamble transmission could fail due to a wrong estimation of initial UL power transmission. If the message is received before the X ms, the previously performed measurement(s) could be considered valid and the WD 110 does not have to perform any update in the measurements. As another example, in certain embodiments the one or more criteria may include WD speed, which could indicate that changes are more likely to occur if the WD speed is higher. In certain embodiments, a speed state may be defined, or one or more speed thresholds may be used. As another example, in certain embodiments the one or more criteria may include WD movements (e.g., rotation). If, for example, a rotation is detected between the time WD 110 performed the latest measurements, WD 110 should perform measurement updates before selecting the beam to start random access.

In certain embodiments, a combination of the above-described criteria may be used to determine whether to use previously performed measurement results per beam index or perform an update of measurements.

In certain embodiments, WD 110 may use other methods to estimate beam quality (instead of or in addition to measuring the beam quality). For example, in certain embodiments WD 110 may extrapolate the beam quality for a particular beam based on measurements performed on another beam. The outcome of that phase can be, for example, the following:

[Beam(1): RSRP-1, Beam(2): RSRP2, Beam(K): RSRP (K)], and/or

[Beam(1): RSRQ-1, Beam(2): RSRQ2, Beam(K): RSRQ (K)] and/or

[Beam(1): SINR-1, Beam(2): SINR-2, Beam(K): SINR (K)]

for K suitable beam indexes, where all of them have their measurement quantity, RSRP in this example, above the threshold.

WD 110 determines, based on the obtained estimate of beam quality for each beam associated with the one or more sets of dedicated RACH resources, whether any beam associated with the one or more sets of dedicated RACH resources meets one or more criteria of a first set of criteria for performing random access. WD 110 performs random access based on whether any beam associated with the one or more sets of dedicated RACH resources meets the one or more criteria of the first set of criteria for performing random access. This is described in more detail below in relation to FIGS. 4A and 4B.

Figure 4A:
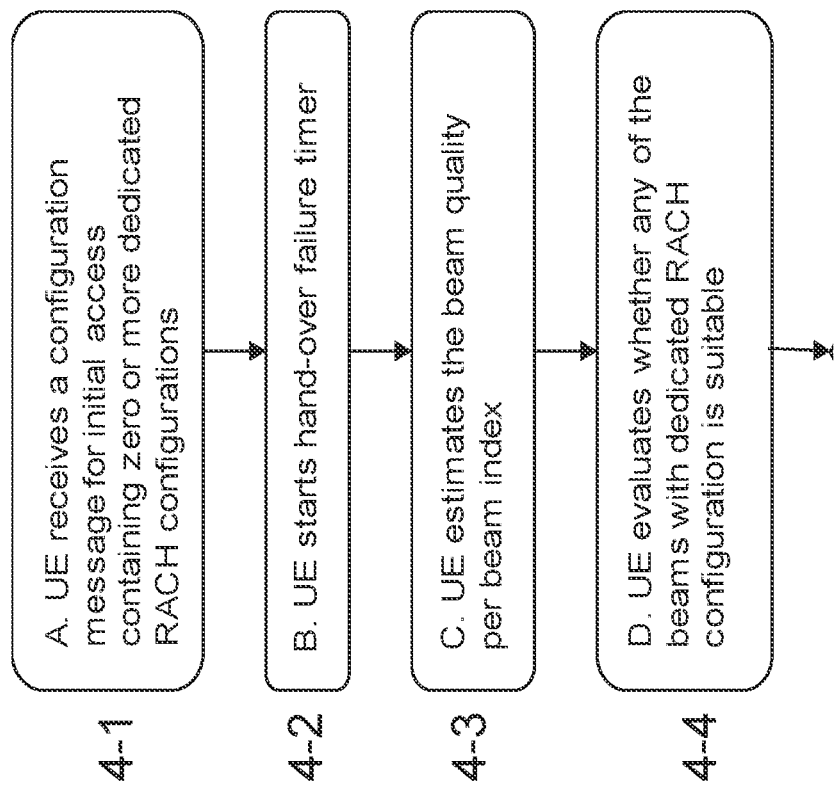
FIGS. 4A and 4B illustrate an example multi-beam random access procedure, in accordance with certain embodiments.
Figure 4B:
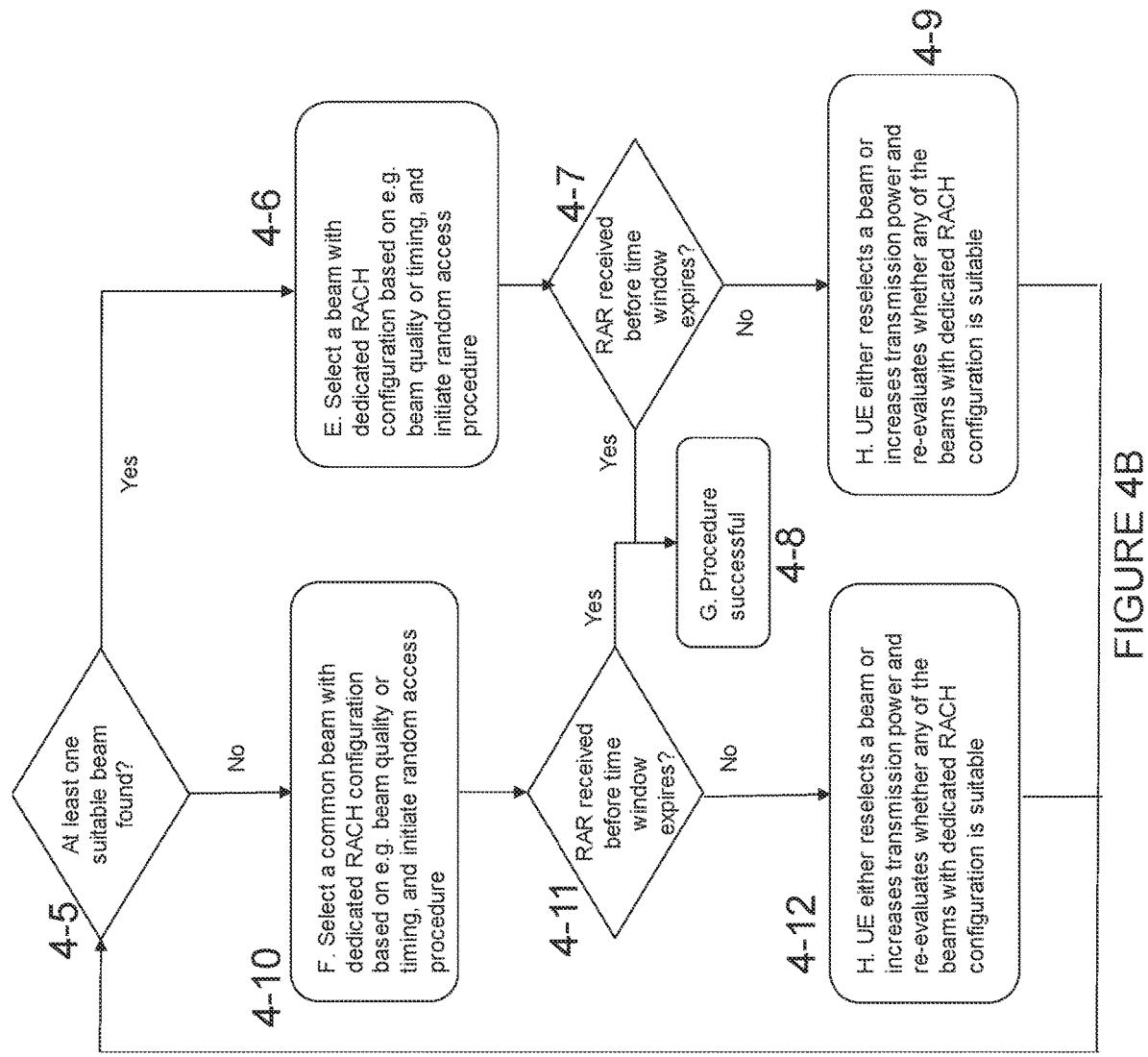

FIGS. 4A and 4B illustrate an example multi-beam random access procedure, in accordance with certain embodiments. Referring now to FIG. 4A, the multi-beam random access procedure begins at step 4-1, where a WD (e.g., a UE) receives a message from a network node containing zero or more dedicated RACH resources associated to beams associated to the target cell the WD should synchronize to and perform random access. In certain embodiments, the message may also contain common RACH resources.

Upon (or in response to) receiving the message, at step 4-2 the WD starts a timer. In the example of FIGS. 4A and 4B, the timer is a Handover Failure timer (e.g., a T304-like timer). As described in more detail below, however, the embodiments described herein are not limited to handover failure, and the timer started at step 4-2 may be a different timer.

At step 4-3, the WD estimates the beam quality per beam index associated to the target cell as described above (e.g., the WD can use previous estimates for some or all of the beams, the WD can use previously performed measurement results per beam index, the WD can update the measurement results per beam index for the target cell, and/or extrapolate the beam quality for a particular beam based on measurements performed on another beam).

At step 4-4, the WD evaluates whether any of the beams with dedicated RACH configuration are suitable. As described above, a suitable beam may be one whose measurement results fulfil a condition. For example, a suitable beam may be one whose measurement results fulfil a condition based on an absolute threshold. In other words, the WD determines, based on the obtained estimate of beam quality for each beam associated with the one or more sets of dedicated RACH resources, whether any beam associated with the one or more sets of dedicated RACH resources meets one or more criteria of a first set of criteria for performing random access. In certain embodiments, the one or more criteria of the first set of criteria may comprise one or more of an RSRP threshold; an RSRQ threshold; and an SINR threshold. As described in more detail below, the WD performs random access based on whether any beam associated with the one or more sets of dedicated RACH resources meets the one or more criteria of the first set of criteria for performing random access.

From step 4-5, the method proceeds based on whether the WD identifies any of the beams that have been configured with associated dedicated RACH resources is suitable. If at least one beam with associated dedicated RACH resources is suitable, the method proceeds to step 4-6.

At step 4-6, the WD selects a beam configured with associated dedicated RACH resources. In certain embodiments, only one of the beams configured with associated dedicated RACH resources may be suitable. In such a scenario, the WD performs random access using the associated resources (e.g., transmits a random access preamble using the dedicated resources associated with the selected beam and start the configured RAR time window).

In certain embodiments, more than one beam configured with associated dedicated RACH resources may be suitable. In such a scenario, the WD may select one of the suitable beams and perform random access with the resources associated with the selected beam (e.g., transmit a random access preamble using the dedicated resources associated with the selected beam and start the configured RAR time window). In certain embodiments, the WD may select one of the plurality of beams based on one or more criteria of a second set of criteria. The WD may use any suitable criteria to select one of multiple suitable beams. As one example, in certain embodiments the WD may select the suitable beam with strongest measurement quantity. As another example, in certain embodiments the WD may select the suitable beam whose time domain RACH resources occur first, to prioritize latency. As still another example, in certain embodiments the WD may select the suitable beam that has higher stability (e.g., based on radio condition statistics, the WD may determine that the radio conditions for a beam have not changed dramatically within a period of time, and select that beam). In certain embodiments, a combination of the above-described criteria of the second set of criteria may be used to select one of multiple suitable beams.

Although the description above describes selecting a beam based on the above-described criteria, in certain embodiments, if multiple beams with dedicated RACH resources are suitable, the WD may send multiple preambles for any subset of dedicated RACH resources associated to the suitable beams.

At step 4-7, the WD determines whether it has received a RAR before the RAR time window expires. If the WD receives a RAR scrambled with the WD's RA-RNTI and containing the WD's RAPID within the RAR window, the method proceeds to step 4-8. At step 4-8, the procedure is considered successful and the WD prepares the handover complete message to be transmitted to the target cell.

If the WD does not receive a RAR before the RAR time window expires, the method proceeds to step 4-9. At step 4-9, the WD either (1) performs power ramping (i.e., increases transmission power) on the same beam or (2) switches to a new beam using the same power. In certain embodiments, the WD may also re-estimate the beam quality per beam index. If after re-evaluating the quality there is at least one suitable beam with dedicated RACH, the WD selects the one fulfilling one or more of the criteria described above in the second set of criteria.

If after re-evaluating the quality there are no suitable beam with dedicated RACH, the WD verifies whether the T304 timer initiated at step 4-2 is still running. If the T304 has not expired, the WD proceeds again through steps 4-5 and on to step 4-10 (described in more detail below), where the WD selects a suitable beam (e.g., a beam fulfilling one or more criteria of the first set and/or second set of criteria described above) with common RACH resources. Otherwise, if the T304 timer initiated at step 4-2 has expired, the WD declares random access failure and informs upper layers.

Referring back to step 4-5, if at step 4-5 none of the beams with associated dedicated RACH resources are suitable, the method proceeds to step 4-10. At step 4-10, the WD selects a suitable beam (e.g., a beam fulfilling one or more criteria of the first set and/or second set of criteria described above) with common RACH resources and performs random access with the resources associated with the selected beam (e.g., transmits a random access preamble using the common resources associated with the selected beam and starts the configured RAR time window).

At step 4-11, the WD determines whether it has received a RAR before the RAR time window expires. If the WD receives a RAR scrambled with the WD's RA-RNTI and containing the WD's RAPID within the RAR window, the method proceeds to step 4-8. At step 4-8, the procedure is considered successful and the WD prepares the handover complete message to be transmitted to the target cell.

If the WD does not receive a RAR before the RAR time window expires, the method proceeds to step 4-12. At step 4-12, the WD either (1) performs power ramping (i.e., increases transmission power) on the same beam or (2) switches to a new beam using the same power. In certain embodiments, the WD may also re-estimate the beam quality per beam index. If after re-evaluating the quality there is at least one suitable beam with dedicated RACH, the WD selects the one fulfilling one or more of the criteria described above in the second set of criteria.

If after re-evaluating the quality there is no suitable beam with dedicated RACH, the WD verifies whether the T304 timer initiated at step 4-2 is still running. If the T304 has not expired, the WD shall select a suitable beam with common RACH resources fulfilling one or more criteria in the first set and/or second set of criteria described above and return to step 4-6. Otherwise, if the T304 timer initiated at step 4-2 has expired, the WD declares random access failure and informs upper layers.

In certain embodiments, the WD may receive a RAR scrambled with the WD's RA-RNTI and containing a back-off indicator in steps 4-7 or 4-11. In certain embodiments, in such a scenario the WD may back-off as instructed by the back-off indicator and continue the procedure from step 4-12.

Alternatively, in such a scenario the WD may update the beam quality estimation as described above (e.g., the WD can use previous estimates for some or all of the beams, the WD can use previously performed measurement results per beam index, the WD can update the measurement results per beam index for the target cell, or extrapolate the beam quality for a particular beam based on measurements performed on another beam as described above). If the WD can select a different suitable beam than the one used for the previous attempt, the WD may use this new beam and continue the procedure from step 4-12 or 4-9 without doing back-off.

In certain embodiments, the back-off indicator may contain different types of information that will drive different WD actions. For example, in certain embodiments the back-off indicator may be valid for the specific beam the WD has selected and tried to access RACH associated to it. In that case, the WD can try to select any other suitable beam for preamble re-transmission without the need to wait. If the only suitable beam is the one whose back-off indicator is associated to, then the WD waits the back-off time before accessing again.

As another example, the back-off indicator may contain back-off time values for multiple beams (i.e., the WD is only allowed to perform preamble re-transmissions before the back-off time using resources associated to suitable beams not in the provided back-off indicator). In such a scenario where multiple beams are indicated, in certain embodiments the WD may select any with dedicated resources that are suitable and not present in the back-off indicator.

In certain embodiments, the WD may receive a message from the network containing dedicated RACH resources associated to all beams associated to the target cell the WD should synchronize to and perform random access. In such a scenario, upon (or in response to) receiving that message, the WD may perform the steps of the method illustrated in FIGS. 4A and 4B with following modifications.

In certain embodiments, if as an outcome of the (n+1)-th beam re-selection the WD re-selects the same beam as in the n-th (re-)selection, the WD may perform power ramping as that indicates that the same direction was still be best one, although the UL power was not sufficient. Alternatively, the WD may perform (instead or in addition to the power ramping described above) UL beam switching to transmit the preamble (for example, in the case that the WD has the possibility to transmit narrower UL beams compared to wider DL Tx beams that remained unchanged).

In certain embodiments, if as an outcome of the (n+1)-th beam re-selection the WD re-selects another beam compared to the n-th (re-)selection, as an indication that another direction should be tried, the WD starts to perform random access with initial power level estimation and/or continues its power ramping levels.

In such a scenario, the WD may continue the procedure from one of steps 4-9 and 4-12. In other words, the WD starts random access using the selected beam with the associated RACH resource (e.g., time/frequency/sequence) that was provided and starts the timer associated to the configured RAR time window.

In certain embodiments, the WD may receive the RAR scrambled with the WD's RA-RNTI and containing the WD's RAPID. In such a scenario, the WD may stop the timer associated to the configured RAR time window and consider the random access procedure successful. In cases when the timer associated to the configured RAR time window timer expires (or the WD receives a RAR with back-off as described above), the WD can re-attempt the error handling procedure until the counter of transmitted preambles is equal to a previously configured value or the timer (e.g., timer T304) expires. In certain embodiments, the counter may be incremented every time the WD performs a preamble transmission, independently whether: the WD has performed power ramping without UL beam switching and without DL beam switching; the WD has performed power ramping with UL beam switching and without DL beam switching; the WD has performed power ramping with UL beam switching and with DL beam switching; the WD has performed power ramping without UL beam switching and with DL beam switching; the WD has not performed power ramping, but performed UL beam switching with DL beam switching; the WD has not performed power ramping, but performed UL beam switching without DL beam switching; the WD has not performed power ramping, but performed DL beam switching without UL beam switching.

In such a scenario, if all beams have dedicated resources configured for that WD, these resources are valid as long as the timer (e.g., T304 timer) is running. The target network node can maintain that timer and, when it expires, the target node can either convert these into common RACH resources or allocate as dedicated RACH resource to other WDs.

According to another example embodiment, the WD may receive a message from the network that may contain only common RACH resources associated to all beams associated to the target cell that the WD should synchronize to and perform random access. Upon receiving such a message, the WD may perform the same actions described above for the case where the WD receives only dedicated RACH resources, with the exception that the RACH resources used in step 4-9 and/or 4-12 are common resources. If that message does not contain the common RACH the WD shall use the a previously acquired common RACH configuration such as the one defined for the source cell.

Although in the example embodiments above the message received by the WD that triggers the WD to perform random access was described as a handover command message, the present disclosure is not limited to these example embodiments. For example, the embodiments described above are equally applicable to scenarios in which the trigger for the WD to perform random access is not a handover message. For example, the embodiments described above are also applicable to beam recovery scenarios in which beam selection may be triggered by the detection of beam failure. In such a scenario, the WD may be configured with dedicated and common UL channel resources via a message, although the beam selection procedure itself is triggered by other criteria.

Additionally, although the above-described example embodiments use random access as an example of a procedure involving beam selection, the various embodiments described above are also applicable to beam recovery in the sense that the WD also needs to perform beam selection, may also be configured with UL channel resources (like PRACH resources) and also wait for a response before a failure is declared.

Figure 5:
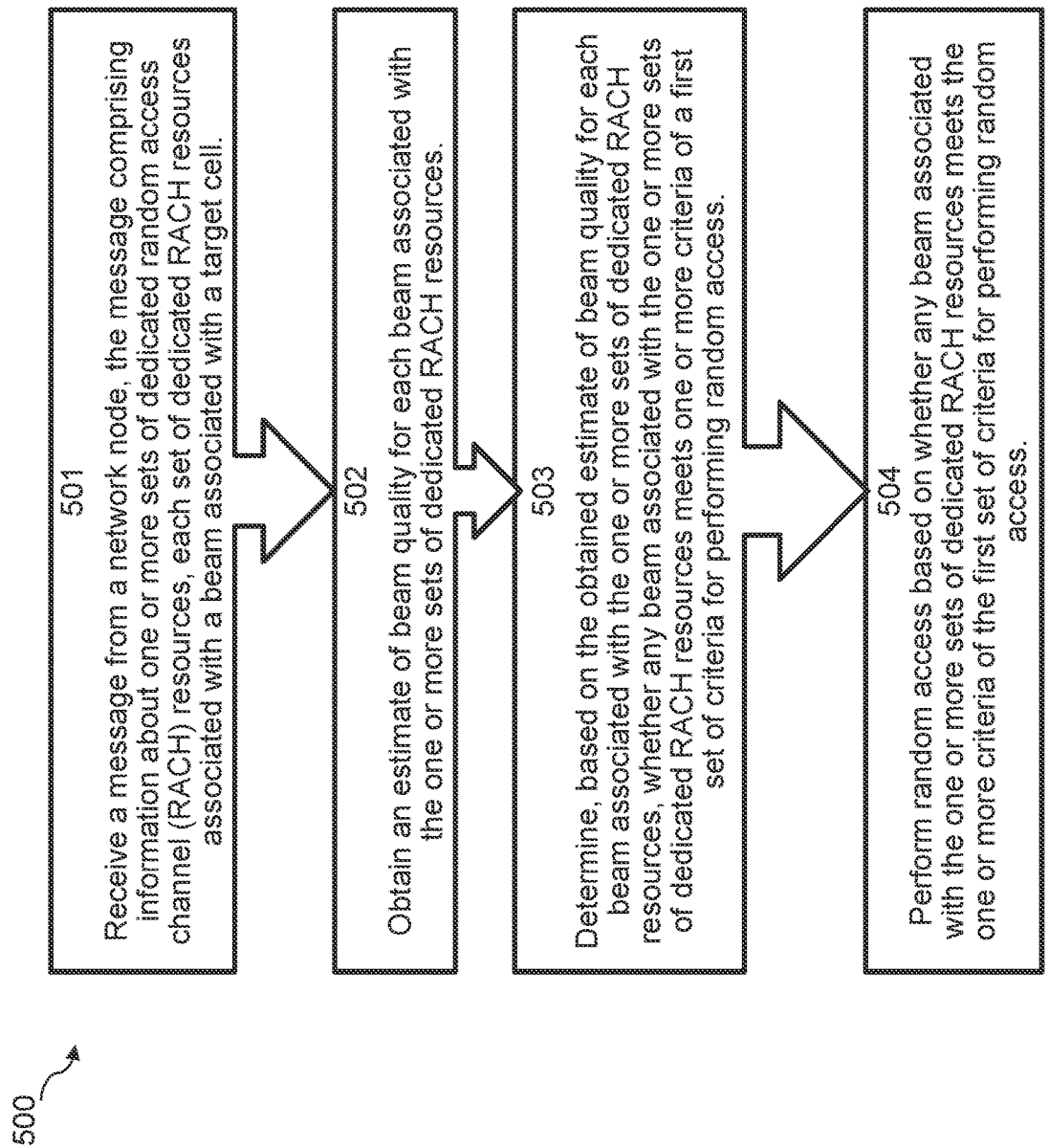
FIG. 5 is a flowchart of a method in a UE, in accordance with certain embodiments.

FIG. 5 is a flowchart of a method 500 in a UE, in accordance with certain embodiments. Method 500 begins at step 501, where the UE receives a message from a network node, the message comprising information about one or more sets of dedicated RACH resources, each set of dedicated RACH resources associated with a beam associated with a target cell.

At step 502, the UE obtains an estimate of beam quality for each beam associated with the one or more sets of dedicated RACH resources.

At step 503, the UE determines, based on the obtained estimate of beam quality for each beam associated with the one or more sets of dedicated RACH resources, whether any beam associated with the one or more sets of dedicated RACH resources meets one or more criteria of a first set of criteria for performing random access.

At step 504, the UE performs random access based on whether any beam associated with the one or more sets of dedicated RACH resources meets the one or more criteria of the first set of criteria for performing random access.

In certain embodiments, determining whether any beam associated with the one or more sets of dedicated RACH resources meets the one or more criteria of the first set of criteria for performing random access at step 503 may comprise determining that at least one beam meets the one or more criteria of the first set of criteria for performing random access.

In certain embodiments, performing random access at step 504 may comprise transmitting a random access preamble using the dedicated RACH resources associated with the at least one beam determined to meet the one or more criteria of the first set of criteria for performing random access.

In certain embodiments, the at least one beam may comprise a plurality of beams, and performing random access at step 504 may comprise selecting one of the plurality of beams based on one or more criteria of a second set of criteria and transmitting a random access preamble using the dedicated resources associated with the selected beam. In certain embodiments, the one or more criteria of the second set of criteria may comprise one or more of: a beam with a strongest measurement quantity; a beam whose time domain RACH resources occur first; and a beam having radio conditions that has had the least amount of change over a period of time.

In certain embodiments, the method may further comprise receiving information about common RACH resources for the target cell. In certain embodiments, the method may further comprise prioritizing dedicated RACH resources over the common RACH resources for performing random access. In certain embodiments, determining whether any beam associated with the one or more sets of dedicated RACH resources meets the one or more criteria of the first set of criteria for performing random access at step 503 may comprise determining that no beam meets the one or more criteria of the first set of criteria for performing random access, and performing random access may comprise transmitting a random access preamble using the common RACH resources.

In certain embodiments, the one or more criteria of the first set of criteria may comprise one or more of: an RSRP threshold; an RSRQ threshold; and an SINR threshold.

In certain embodiments, the beam associated with the target cell may comprise a Synchronization Signal/Physical Broadcast Channel block.

In certain embodiments, the beam associated with the target cell may comprise a CSI-RS resource.

In certain embodiments, obtaining the estimate of beam quality for each beam associated with the one or more sets of dedicated RACH resources at step 502 may comprise performing one or more measurements on each beam associated with the one or more sets of dedicated RACH resources, the one or more measurements indicative of beam quality. In certain embodiments, the one or more measurements may comprise one or more of: an RSRP measurement; an RSRQ measurement; and a SINR measurement.

In certain embodiments, obtaining the estimate of beam quality for each beam associated with the one or more sets of dedicated RACH resources at step 502 may comprise obtaining results of one or more previously performed measurements on each beam associated with the one or more sets of dedicated RACH resources, the one or more previously performed measurements indicative of beam quality. In certain embodiments, the one or more previously performed measurements may comprise one or more of: an RSRP measurement; an RSRQ measurement; and a SINR measurement.

In certain embodiments, performing random access at step 504 may comprise initiating a random access procedure, and the method may further comprise starting a timer in response to initiating the random access procedure.

In certain embodiments, the message received at step 501 may be a handover configuration message, and the random access procedure may be initiated in response to receiving the handover configuration message. In certain embodiments, the timer may comprise a handover failure timer.

In certain embodiment, the method may comprise detecting a beam failure. The random access procedure may be initiated in response to detecting the beam failure, and the message received at step 501 may be received after the beam failure is detected. In certain embodiments, the timer may comprise a beam failure recovery timer.

In certain embodiments, the method may further comprise receiving a random access response message before the timer expires. In certain embodiments, the received random access response message may comprise an instruction to the UE to back off.

In certain embodiments, the method may further comprise determining that no random access response message was received before the timer expired. In certain embodiments, the method may further comprise selecting a different beam for performing random access. In certain embodiments, the method may further comprise increasing a transmission power of the UE; and reevaluating whether any beam associated with the one or more sets of dedicated RACH resources meets one or more criteria of a first set of criteria for performing random access.

Figure 6:
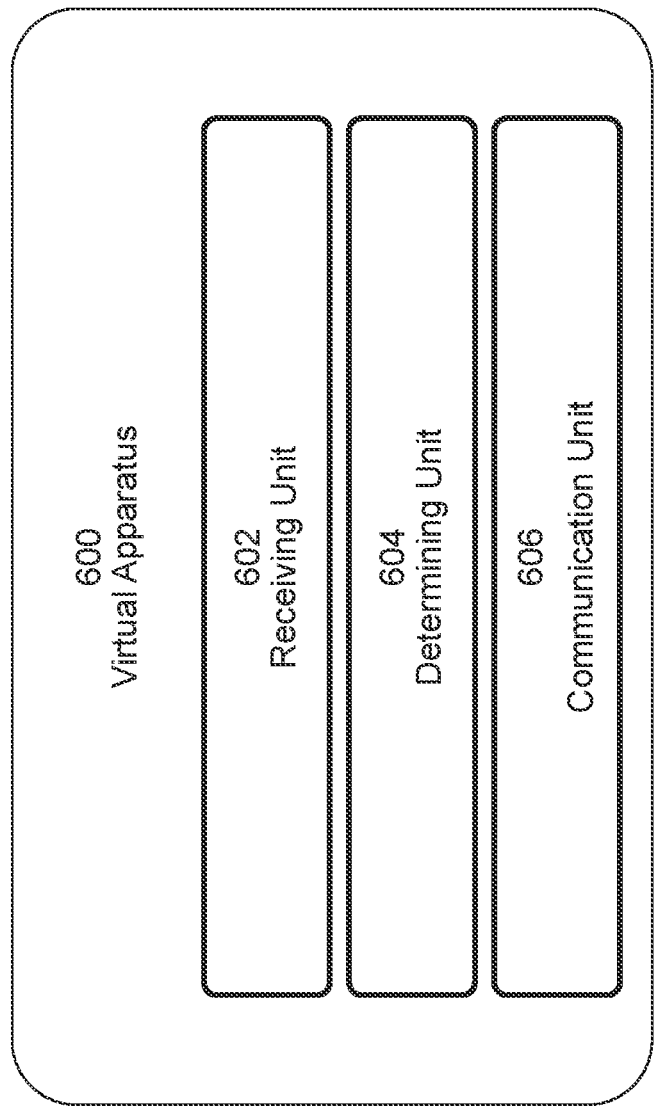
FIG. 6 is a schematic block diagram of a virtualization apparatus, in accordance with certain embodiments.

FIG. 6 is a schematic block diagram of a virtualization apparatus, in accordance with certain embodiments. More particularly, FIG. 6 illustrates a schematic block diagram of an apparatus 600 in a wireless network (for example, the wireless network shown in FIG. 3). The apparatus may be implemented in a wireless device (e.g., wireless device 110 shown in FIG. 3). Apparatus 600 is operable to carry out the example method described with reference to FIG. 5 above and possibly any other processes or methods disclosed herein. It is also to be understood that the method of FIG. 5 is not necessarily carried out solely by apparatus 600. At least some operations of the method can be performed by one or more other entities.

Virtual Apparatus 600 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 602, determining unit 604, communication unit 606, and any other suitable units of apparatus 600 to perform corresponding functions according one or more embodiments of the present disclosure.

As illustrated in FIG. 6, apparatus 600 includes receiving unit 602, determining unit 604, and communication unit 606. Receiving unit 602 may be configured to perform the receiving functions of apparatus 600. For example, receiving unit 602 may be configured to receive a message from a network node, the message comprising information about one or more sets of dedicated RACH resources, each set of dedicated RACH resources associated with a beam associated with a target cell. As another example, receiving unit 602 may be configured to receive information about common RACH resources for the target cell. As still another example, receiving unit 602 may be configured to receive a random access response message before a timer expires. As yet another example, receiving unit 602 may be configured to obtain an estimate of beam quality for each beam associated with the one or more sets of dedicated RACH resources.

Receiving unit 602 may receive any suitable information from a network node or another wireless device. Receiving unit 602 may include a receiver and/or a transceiver, such as RF transceiver circuitry 122 described above in relation to FIG. 3. Receiving unit 602 may include circuitry configured to wirelessly receive messages and/or signals. In particular embodiments, receiving unit 602 may communicate received messages and/or signals to determining unit 604 or any other suitable unit of apparatus 600. The functions of receiving unit 604 may, in certain embodiments, be performed in one or more distinct units.

Determining unit 604 may perform the processing functions of apparatus 600. For example, determining unit 604 may be configured to obtaining an estimate of beam quality for each beam associated with the one or more sets of dedicated RACH resources. In certain embodiments, determining unit 604 may be configured to perform one or more measurements on each beam associated with the one or more sets of dedicated RACH resources, the one or more measurements indicative of beam quality. In certain embodiments, determining unit 604 may be configured to obtain results of one or more previously performed measurements on each beam associated with the one or more sets of dedicated RACH resources, the one or more previously performed measurements indicative of beam quality.

As another example, determining unit 604 may be configured to determine, based on the obtained estimate of beam quality for each beam associated with the one or more sets of dedicated RACH resources, whether any beam associated with the one or more sets of dedicated RACH resources meets one or more criteria of a first set of criteria for performing random access. In certain embodiments, determining unit 604 may be configured to determine that at least one beam meets the one or more criteria of the first set of criteria for performing random access. In certain embodiments, the at least one beam may comprise a plurality of beams and determining unit 604 may be configured to select one of the plurality of beams based on one or more criteria of a second set of criteria. In certain embodiments, determining unit 604 may be configured to determine that no beam meets the one or more criteria of the first set of criteria for performing random access.

As still another example, determining unit 604 may be configured to perform random access based on whether any beam associated with the one or more sets of dedicated RACH resources meets the one or more criteria of the first set of criteria for performing random access.

As yet another example, determining unit 604 may be configured to prioritize dedicated RACH resources over the common RACH resources for performing random access.

As another example, determining unit 604 may be configured to initiate a random access procedure. In certain embodiments, the message received by receiving unit 602 may be a handover configuration message and determining unit 604 may be configured to initiate the random access procedure in response to receiving the handover configuration message. As another example, determining unit 604 may be configured to start a timer in response to initiating the random access procedure.

As another example, determining unit 604 may be configured to detect a beam failure. In certain embodiments, determining unit 604 may be configured to initiate a random access procedure in response to detecting the beam failure.

As another example, determining unit 604 may be configured to determine that no random access response message was received before the timer expired. In certain embodiments, determining unit 604 may be configured to select a different beam for performing random access. In certain embodiments, determining unit 604 may be configured to increase a transmission power of the WD and reevaluate whether any beam associated with the one or more sets of dedicated RACH resources meets one or more criteria of a first set of criteria for performing random access.

Determining unit 604 may include or be included in one or more processors, such as processing circuitry 120 described above in relation to FIG. 3. Determining unit 604 may include analog and/or digital circuitry configured to perform any of the functions of determining unit 604 and/or processing circuitry 120 described above. The functions of determining unit 604 may, in certain embodiments, be performed in one or more distinct units.

Communication unit 606 may be configured to perform the transmission functions of apparatus 600. For example, communication unit 606 may be configured to transmit a random access preamble using the dedicated RACH resources associated with the at least one beam determined to meet the one or more criteria of the first set of criteria for performing random access. As another example, communication unit 606 may be configured to transmit a random access preamble using the dedicated resources associated with the selected beam. As still another example, communication unit 606 may be configured to transmit a random access preamble using the common RACH resources.

Communication unit 606 may transmit messages to one or more network nodes or other wireless devices. Communication unit 606 may include a transmitter and/or a transceiver, such as RF transceiver circuitry 122 described above in relation to FIG. 3. Communication unit 606 may include circuitry configured to wirelessly transmit messages and/or signals. In particular embodiments, communication unit 606 may receive messages and/or signals for transmission from determining unit 604 or any other unit of apparatus 600. The functions of communication unit 604 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 7:
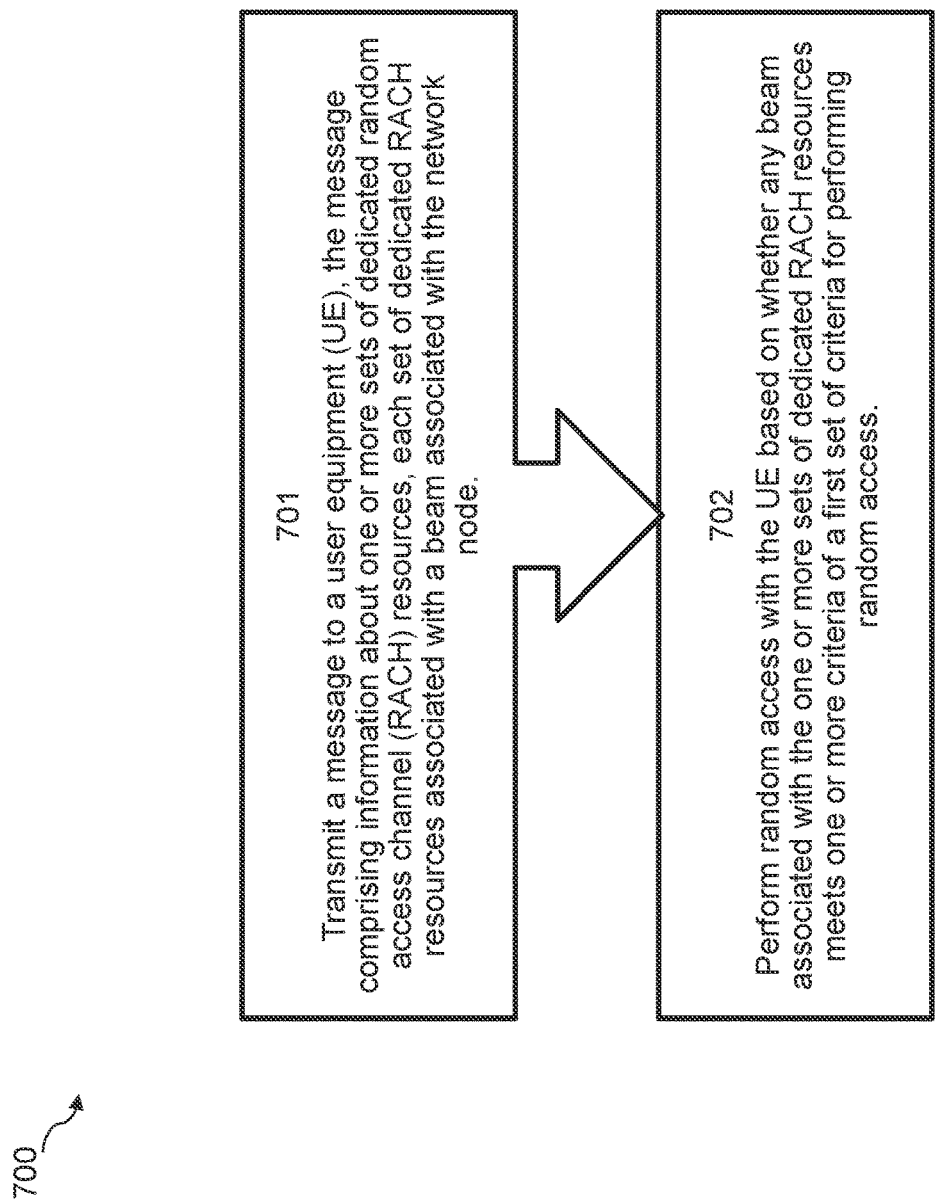
FIG. 7 is a flowchart of a method in a network node, in accordance with certain embodiments.

FIG. 7 is a flowchart of a method 700 in a network node, in accordance with certain embodiments. Method 700 begins at step 701, where the network node transmits a message to a UE, the message comprising information about one or more sets of dedicated RACH resources, each set of dedicated RACH resources associated with a beam associated with the network node. In certain embodiments, the network node may be a target network node.

In certain embodiments, the transmitted message may be a handover configuration message.

In certain embodiments, the transmitted message may be transmitted in response to the UE detecting a beam failure.

At step 702, the network node performs random access with the UE based on whether any beam associated with the one or more sets of dedicated RACH resources meets one or more criteria of a first set of criteria for performing random access.

In certain embodiments, at least one beam may meet the one or more criteria of the first set of criteria for performing random access.

In certain embodiments, performing random access at step 702 may comprise receiving a random access preamble from the UE on the dedicated RACH resources associated with the at least one beam that meets the one or more criteria of the first set of criteria for performing random access.

In certain embodiments, the at least one beam may comprise a plurality of beams and performing random access at step 702 may comprise receiving a random access preamble from the UE on dedicated RACH resources associated with one of the plurality of beams selected by the UE based on one or more criteria of a second set of criteria. In certain embodiments, the one or more criteria of the second set of criteria may comprise one or more of: a beam with a strongest measurement quantity; a beam whose time domain RACH resources occur first; and a beam having radio conditions that has had the least amount of change over a period of time.

In certain embodiments, no beam associated with the one or more sets of dedicated RACH resources may meet the one or more criteria of the first set of criteria for performing random access, and the method may comprise: transmitting information about common RACH resources for the network node; and receiving a random access preamble from the UE on the common RACH resources. In certain embodiments, the method may comprise configuring the UE to prioritize dedicated RACH resources over the common RACH resources for performing random access.

In certain embodiments, the one or more criteria of the first set of criteria may comprise one or more of: an RSRP threshold; an RSRQ threshold; and an SINR threshold.

In certain embodiments, the beam associated with the network node may comprise an SSB block.

In certain embodiments, the beam associated with the network node may comprise a CSI-RS resource.

In certain embodiments, the method may further comprise transmitting a random access response message to the UE.

Figure 8:
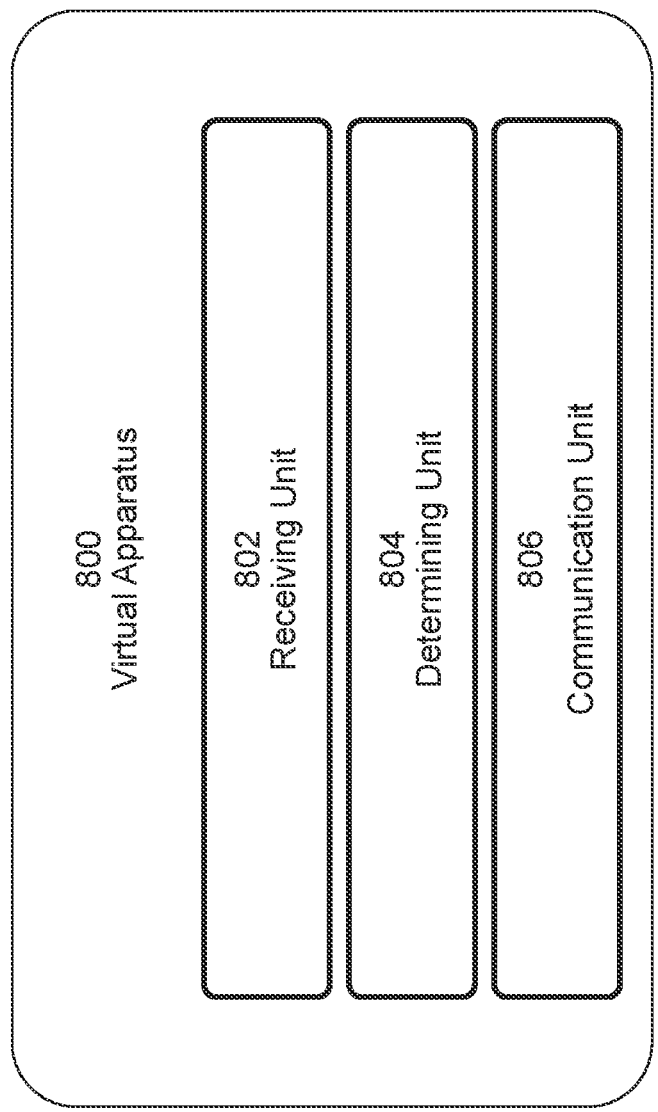
FIG. 8 is a schematic block diagram of a virtualization apparatus, in accordance with certain embodiments.

FIG. 8 is a schematic block diagram of a virtualization apparatus, in accordance with certain embodiments. More particularly, FIG. 6 illustrates a schematic block diagram of an apparatus 800 in a wireless network (for example, the wireless network shown in FIG. 3). The apparatus may be implemented in a network node (e.g., network node 160 shown in FIG. 3). Apparatus 800 is operable to carry out the example method described with reference to FIG. 7 above and possibly any other processes or methods disclosed herein. It is also to be understood that the method of FIG. 7 is not necessarily carried out solely by apparatus 800. At least some operations of the method can be performed by one or more other entities.

Virtual Apparatus 800 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 802, determining unit 804, communication unit 806, and any other suitable units of apparatus 800 to perform corresponding functions according one or more embodiments of the present disclosure.

As illustrated in FIG. 8, apparatus 800 includes receiving unit 802, determining unit 804, and communication unit 806. Receiving unit 802 may be configured to perform the receiving functions of apparatus 800. For example, receiving unit 802 may be configured to receive a random access preamble from the UE on the dedicated RACH resources associated with the at least one beam that meets the one or more criteria of the first set of criteria for performing random access. As another example, receiving unit 802 may be configured to receiving a random access preamble from the UE on dedicated RACH resources associated with one of the plurality of beams selected by the UE based on one or more criteria of a second set of criteria. As still another example, receiving unit 802 may be configured to receive a random access preamble from the UE on the common RACH resources.

Receiving unit 802 may receive any suitable information from a network node or another wireless device. Receiving unit 802 may include a receiver and/or a transceiver, such as RF transceiver circuitry 172 described above in relation to FIG. 3. Receiving unit 802 may include circuitry configured to wirelessly receive messages and/or signals. In particular embodiments, receiving unit 802 may communicate received messages and/or signals to determining unit 804 or any other suitable unit of apparatus 800. The functions of receiving unit 804 may, in certain embodiments, be performed in one or more distinct units.

Determining unit 804 may perform the processing functions of apparatus 800. For example, determining unit 804 may be configured to perform random access with the UE based on whether any beam associated with the one or more sets of dedicated RACH resources meets one or more criteria of a first set of criteria for performing random access. As another example, determining unit 804 may be configured to configure the UE to prioritize dedicated RACH resources over the common RACH resources for performing random access.

Determining unit 804 may include or be included in one or more processors, such as processing circuitry 170 described above in relation to FIG. 3. Determining unit 804 may include analog and/or digital circuitry configured to perform any of the functions of determining unit 804 and/or processing circuitry 170 described above. The functions of determining unit 804 may, in certain embodiments, be performed in one or more distinct units.

Communication unit 806 may be configured to perform the transmission functions of apparatus 800. For example, communication unit 806 may be configured to transmit a message to a UE, the message comprising information about one or more sets of dedicated random access channel RACH resources, each set of dedicated RACH resources associated with a beam associated with the network node. As another example, communication unit 806 may be configured to transmit information about common RACH resources for the network node. As still another example, communication unit 806 may be configured to transmit a random access response message to the UE.

Communication unit 806 may transmit messages to one or more network nodes or other wireless devices. Communication unit 806 may include a transmitter and/or a transceiver, such as RF transceiver circuitry 172 described above in relation to FIG. 3. Communication unit 806 may include circuitry configured to wirelessly transmit messages and/or signals. In particular embodiments, communication unit 806 may receive messages and/or signals for transmission from determining unit 804 or any other unit of apparatus 600. The functions of communication unit 804 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 9:
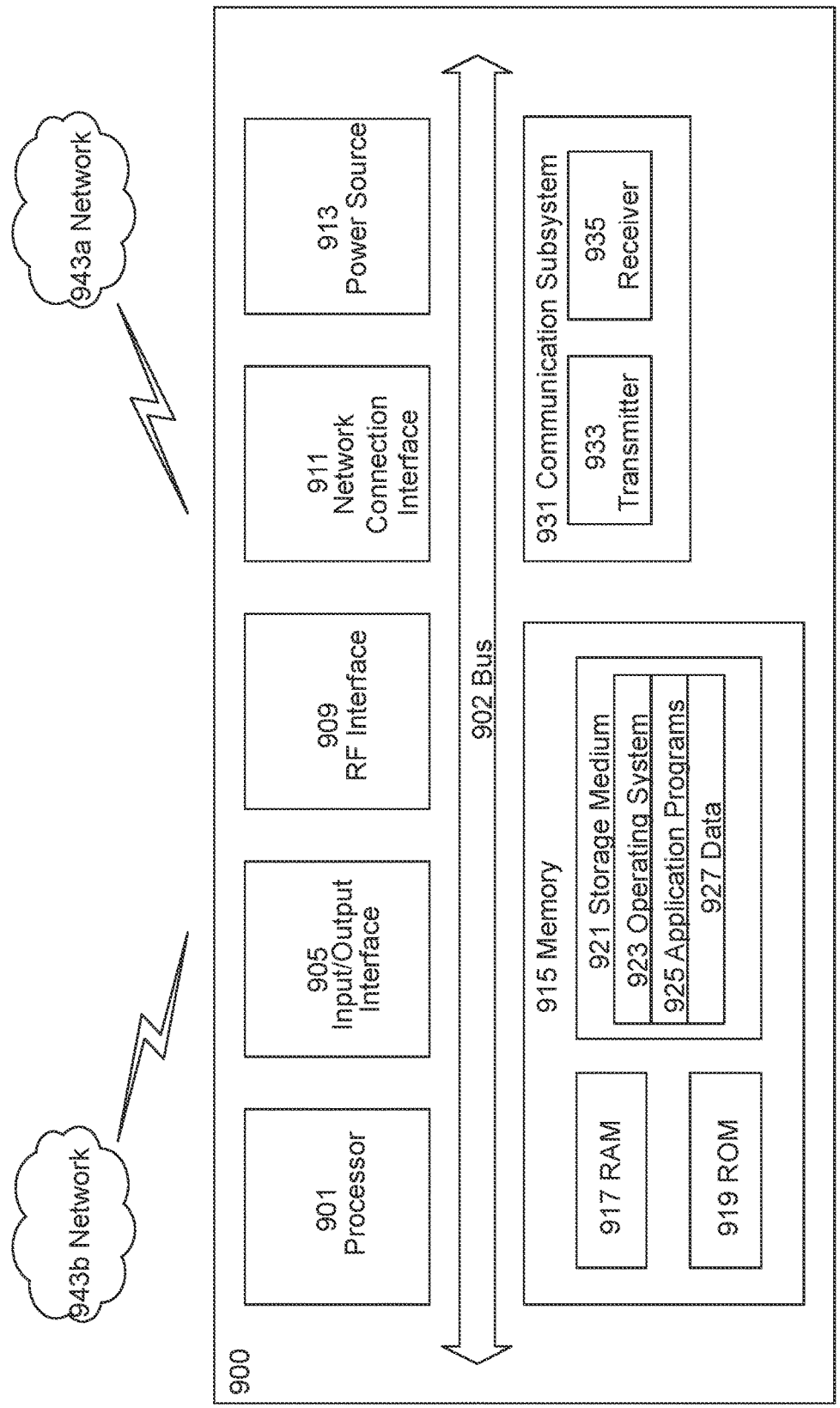
FIG. 9 illustrates one embodiment of a UE, in accordance with certain embodiments.

FIG. 9 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 913, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source QQ 213 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
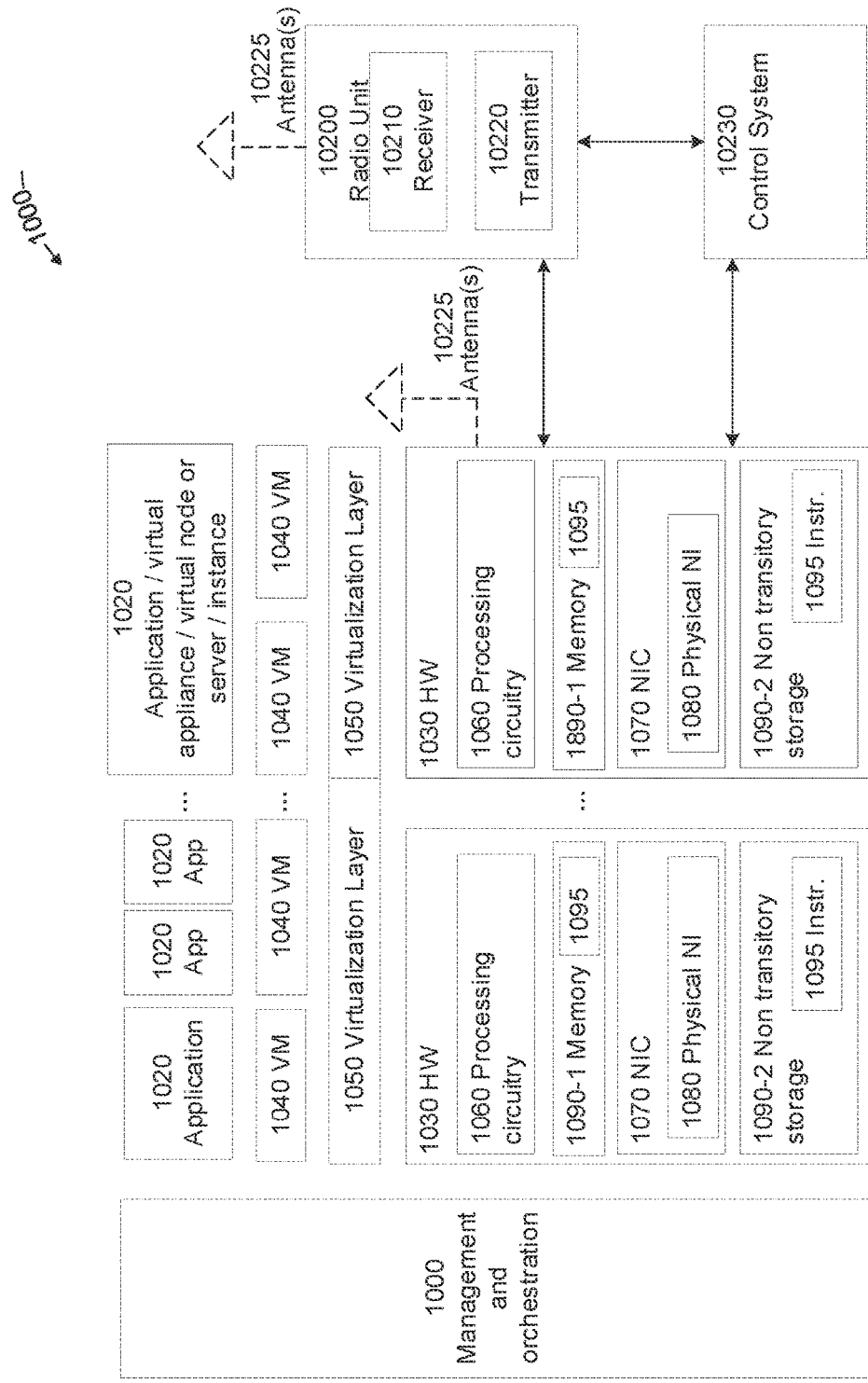
FIG. 10 is a schematic block diagram illustrating a virtualization environment, in accordance with certain embodiments.

FIG. 10 is a schematic block diagram illustrating a virtualization environment, in accordance with certain embodiments. More particularly, FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
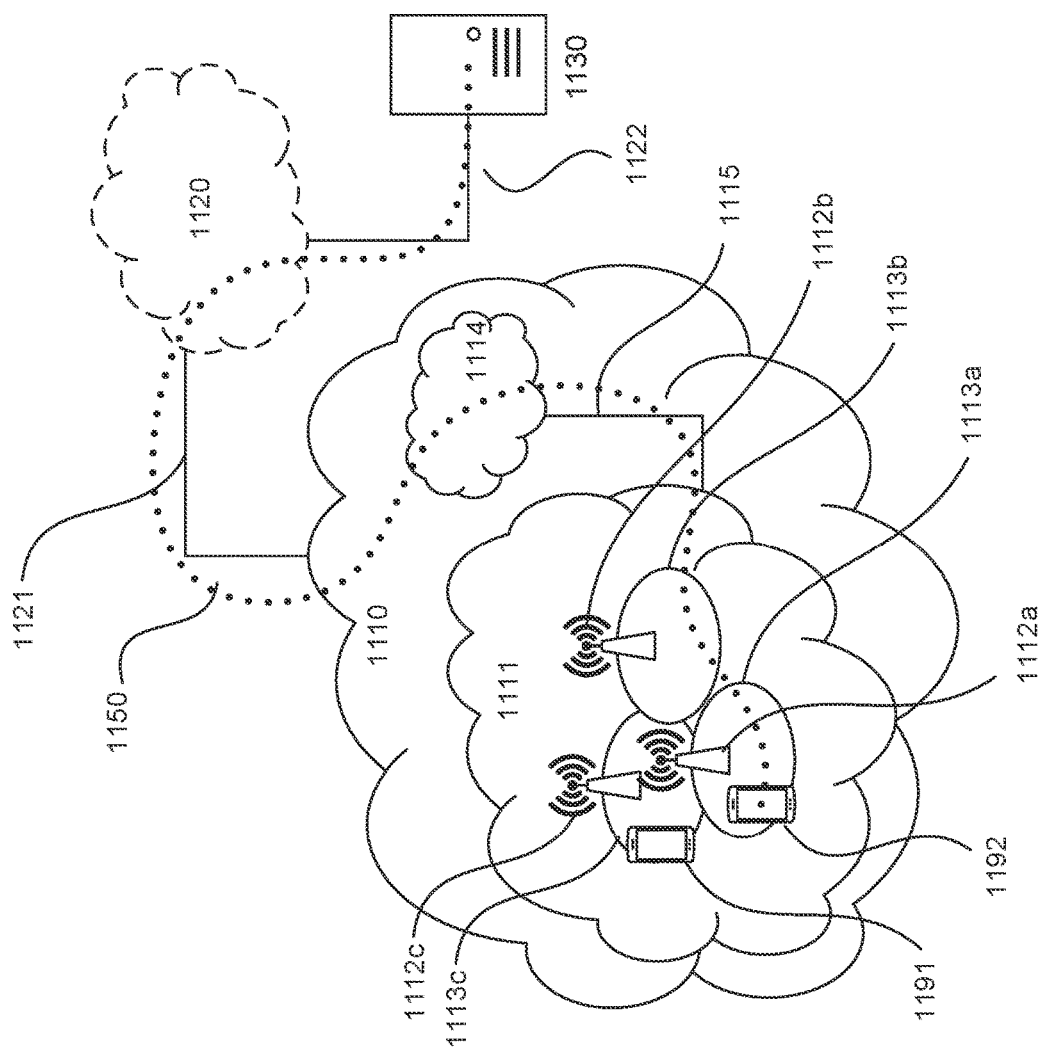
FIG. 11 illustrates an example telecommunication network connected via an intermediate network to a host computer, in accordance with certain embodiments.

FIG. 11 illustrates an example telecommunication network connected via an intermediate network to a host computer, in accordance with certain embodiments. With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of UL and DL communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing UL communication originating from the UE 1191 towards the host computer 1130.

Figure 12:
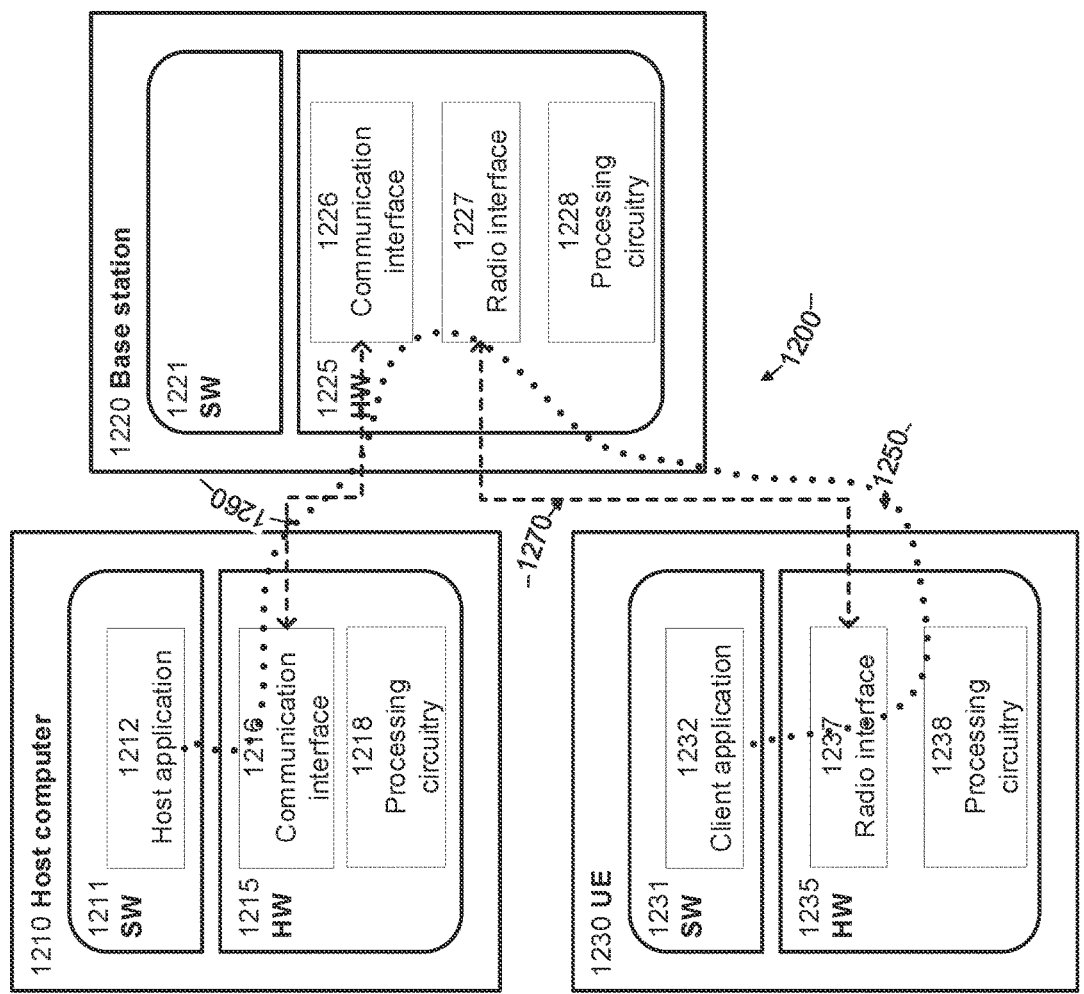
FIG. 12 illustrates an example of a host computer communicating via a base station with a UE over a partially wireless connection, in accordance with certain embodiments.

FIG. 12 illustrates an example of a host computer communicating via a base station with a UE over a partially wireless connection, in accordance with certain embodiments. Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not explicitly shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the power consumption and thereby provide benefits such as extended battery lifetime and reduced user waiting time.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
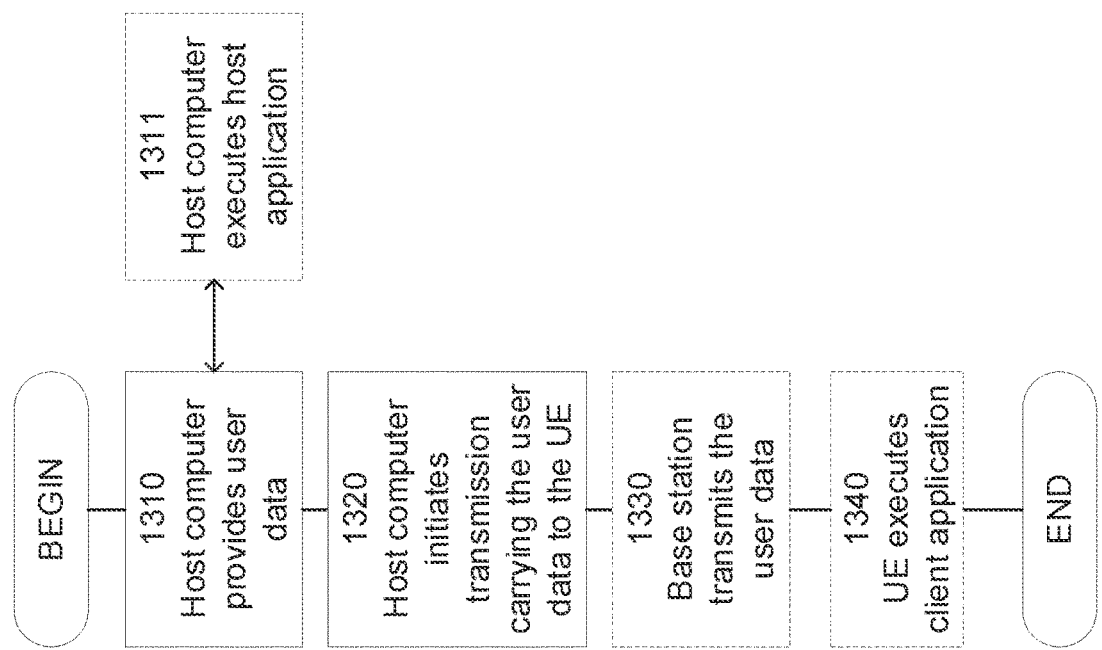
FIG. 13 is a flowchart of a method implemented in a communication system, in accordance with certain embodiments.

FIG. 13 is a flowchart of a method implemented in a communication system, in accordance with certain embodiments. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
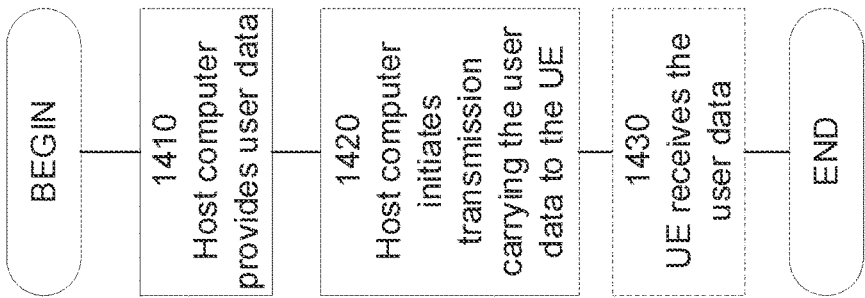
FIG. 14 is a flowchart of a method implemented in a communication system, in accordance with certain embodiments.

FIG. 14 is a flowchart of a method implemented in a communication system, in accordance with certain embodiments. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
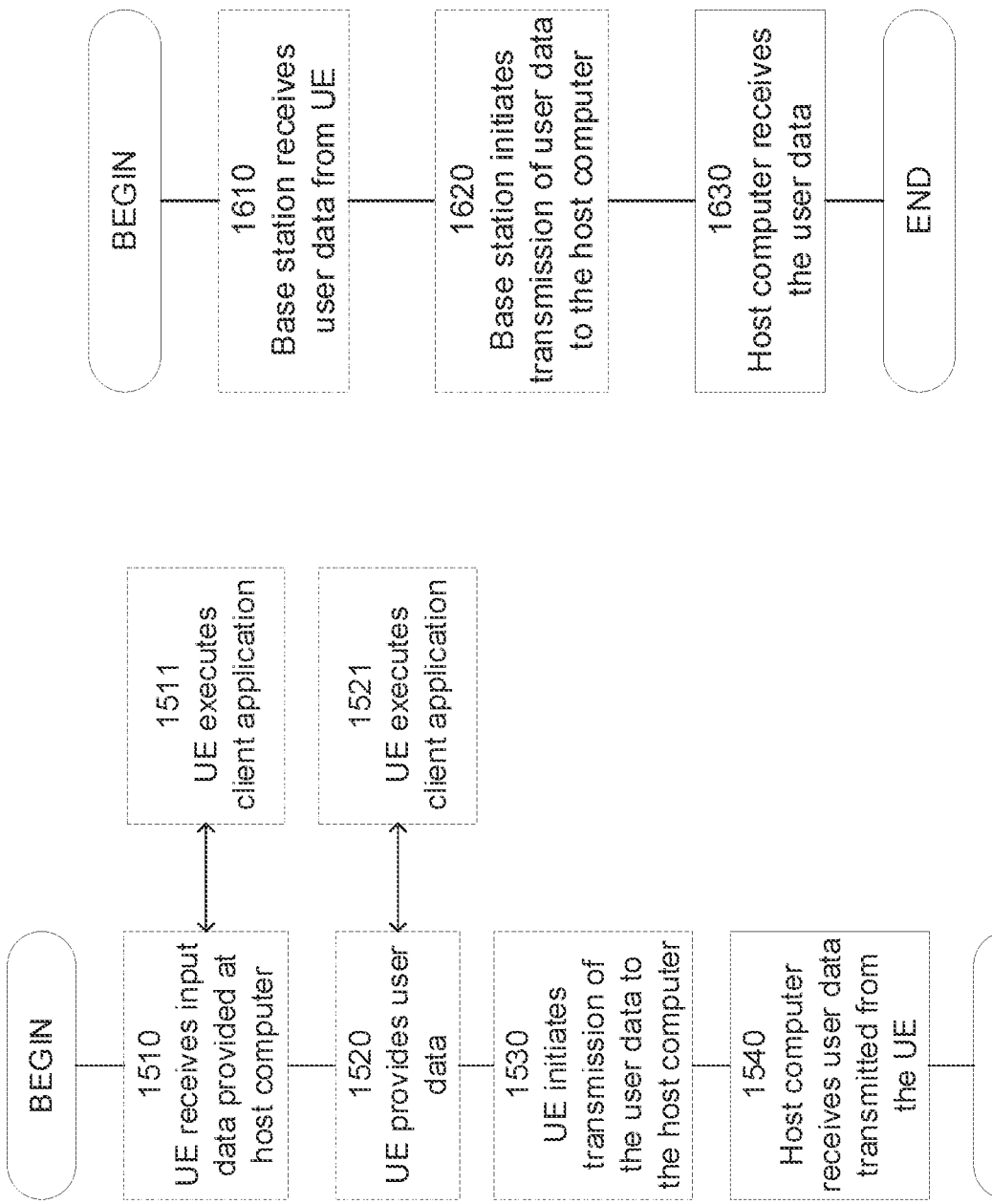
FIG. 15 is a flowchart of a method implemented in a communication system, in accordance with certain embodiments.
FIG. 16 is a flowchart of a method implemented in a communication system, in accordance with certain embodiments.

FIG. 15 is a flowchart of a method implemented in a communication system, in accordance with certain embodiments. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart of a method implemented in a communication system, in accordance with certain embodiments. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA 2000 1× Radio Transmission Technology
3GPP 3rd Generation Partnership Project
5G 5th Generation
5GC 5G Core
5GS 5G System
ABS Almost Blank Subframe
AC Access Class
ACB Access Class Barring
ACDC Application specific Congestion control for Data Communication
AN Access Network or Access Node
ARQ Automatic Repeat Request
AS Access Stratum
ASN.1 Abstract Syntax Notation 1
AWGN Additive White Gaussian Noise
BCCH Broadcast Control Channel
BCH Broadcast Channel
BSR Buffer Status Report
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information C-RNTI Cell RNTI
CSFB Circuit-Switched Fallback
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
EAB Extended Access Barring
E-CID Enhanced Cell-ID (positioning method)
E-RAB EPS Radio Access Bearer
E-SMLC Evolved-Serving Mobile Location Centre
ECGI Evolved CGI
eNB E-UTRAN NodeB
ePDCCH enhanced Physical Downlink Control Channel
EPC Evolved Packet Core
EPS Evolved Packet System
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
GT Guard Time
HARQ Hybrid Automatic Repeat Request
HO Handover
HSPA High Speed Packet Access
HRPD High Rate Packet Data
IoT Internet-of-Things
IMS IP Multi-Media Subsystem
LOS Line of Sight
LPP LTE Positioning Protocol
LTE Long-Term Evolution
MAC Medium Access Control
MAC-I Message Authentication Code-Integrity
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MMTel Multi-Media Telephony
MSC Mobile Switching Center
MSG.3 Message 3
NAS Non-Access Stratum
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OMA-DM Open Mobile Alliance Device Management
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
QAM Quadrature Amplitude Modulation
QoS Quality of Service
QCL'ed Quasi-Co-Located
RACH Random Access Channel
RAN Radio Access Network
RAPID Random Access Preamble ID
RAR Random Access Response
RA-RNTI Random Access RNTI
RAT Radio Access Technology
RLM Radio Link Management
RMSI Remaining Minimum System Information
RNC Radio Network Controller
RNL Radio Network Layer
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
Rx Receive
SCH Synchronization Channel
SCell Secondary Cell
SCS Subcarrier Spacing
SDU Service Data Unit
SFN System Frame Number
SGW Serving Gateway
SI System Information
SIB System Information Block
SN Sequence Number
SNR Signal to Noise Ratio
SON Self Optimized Network
SS Synchronization Signal
SSB Synchronization Signal Block
SSAC Service Specific Access Control
SSS Secondary Synchronization Signal
TA Tracking Area
TCP Time for the Cyclic Prefix
TDD Time Division Duplex
TDOA Time Difference of Arrival
TGP Time for the Guard Period
TNL Transport Network Layer
TOA Time of Arrival
TRP Transmission Reception Point
TSS Tertiary Synchronization Signal
TTI Transmission Time Interval
Tx Transmit
UAC Unified Access Control
UE User Equipment
UL Uplink
UMTS Universal Mobile Telecommunication System USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
ZC Zadoff-Chu

The invention claimed is:

1. A method in a user equipment (UE) comprising:
receiving a configuration message from a network node, the configuration message comprising information about one or more dedicated random access channel (RACH) resources associated with one or more beams of a target cell, wherein the information further comprising at least one synchronization signal block (SSB) threshold and at least one channel state information reference signal (CSI-RS) threshold;
obtaining an estimate of a beam quality for each beam associated with the one or more dedicated RACH resources in the configuration message;
upon determining there is at least one SSB with a beam quality greater than the at least one SSB threshold, selecting an SSB with a beam quality greater than the SSB threshold;
upon determining there is no SSB with a beam quality greater than the at least one SSB threshold and there is at least one CSI-RS with a beam quality greater than the CSI-RS threshold, selecting a CSI-RS with a beam quality greater than the CSI-RS threshold; and
transmitting a random access preamble using the selected SSB or CSI-RS.

2. The method of claim 1, further comprising, upon determining there is no SSB with a beam quality greater than the at least one SSB threshold and no CSI-RS with a beam quality greater than the CSI-RS threshold, selecting a common RACH resource.

3. The method of claim 1, wherein obtaining an estimate of a beam quality for each beam associated with the one or more RACH resources in the configuration message comprises performing one or more measurements on each beam associated with the one or more dedicated RACH resources, the one or more measurements indicative of beam quality.

4. The method of claim 1, wherein obtaining an estimate of a beam quality for each beam associated with the one or more RACH resources in the configuration message comprises obtaining results of one or more previously performed measurements on each beam associated with the one or more dedicated RACH resources, the one or more previously performed measurements indicative of beam quality.

5. The method of claim 1, wherein the configuration message is a handover configuration message and a random access procedure is initiated in response to receiving the handover configuration message.

6. A user equipment (UE) comprising:
an interface configured to receive a configuration message from a network node, the configuration message comprising information about one or more dedicated random access channel (RACH) resources associated with one or more beams of a target cell, wherein the information further comprising at least one synchronization signal block (SSB) threshold and at least one channel state information reference signal (CSI-RS) threshold; and
processing circuitry configured to:
obtain an estimate of a beam quality for each beam associated with the one or more dedicated RACH resources in the configuration message;
upon determining there is at least one SSB with a beam quality greater than the at least one SSB threshold, select an SSB with a beam quality greater than the SSB threshold; and
upon determining there is no SSB with a beam quality greater than the at least one SSB threshold and there is at least one CSI-RS with a beam quality greater than the CSI-RS threshold, select a CSI-RS with a beam quality greater than the CSI-RS threshold; and
wherein the interface is further configured to transmit a random access preamble using the selected SSB or CSI-RS.

7. The UE of claim 6, wherein, upon determining there is no SSB with a beam quality greater than the at least one SSB threshold and no CSI-RS with a beam quality greater than the CSI-RS threshold, the processing circuitry is further configured to select a common RACH resource.

8. The UE of claim 6, wherein the processing circuitry configured to obtain an estimate of a beam quality for each beam associated with the one or more RACH resources in the configuration message is further configured to perform one or more measurements on each beam associated with the one or more dedicated RACH resources, the one or more measurements indicative of beam quality.

9. The UE of claim 6, wherein the processing circuitry configured to obtain an estimate of a beam quality for each beam associated with the one or more RACH resources in the configuration message is further configured to obtain results of one or more previously performed measurements on each beam associated with the one or more dedicated RACH resources, the one or more previously performed measurements indicative of beam quality.

10. The UE of claim 6, wherein the configuration message is a handover configuration message and a random access procedure is initiated in response to receiving the handover configuration message.

11. A system comprising:
a network node configured to transmit a configuration message to a user equipment (UE); and
a UE, wherein the UE is configured to:
receive the configuration message from the network node, the configuration message comprising information about one or more dedicated random access channel (RACH) resources associated with one or more beams of a target cell, wherein the information further comprising at least one synchronization signal block (SSB) threshold and at least one channel state information reference signal (CSI-RS) threshold;
obtain an estimate of a beam quality for each beam associated with the one or more dedicated RACH resources in the configuration message;
upon determining there is at least one SSB with a beam quality greater than the at least one SSB threshold, select an SSB with a beam quality greater than the SSB threshold;
upon determining there is no SSB with a beam quality greater than the at least one SSB threshold and there is at least one CSI-RS with a beam quality greater than the CSI-RS threshold, select a CSI-RS with a beam quality greater than the CSI-RS threshold; and
transmit a random access preamble using the selected SSB or CSI-RS.

* * * * *